United States Patent
Ohkawara et al.

(10) Patent No.: US 6,744,468 B2
(45) Date of Patent: *Jun. 1, 2004

(54) LENS CONTROL DEVICE FOR MOVING RANGE CORRECTION

(75) Inventors: Hiroto Ohkawara, Ibaraki-ken (JP); Taeko Tanaka, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,567

(22) Filed: Jan. 13, 1998

(65) Prior Publication Data

US 2002/0135693 A1 Sep. 26, 2002

Related U.S. Application Data

(63) Continuation of application No. 08/417,928, filed on Apr. 6, 1995, now abandoned.

(30) Foreign Application Priority Data

Apr. 12, 1994 (JP) .............................................. 6-098028
Apr. 12, 1994 (JP) .............................................. 6-098029

(51) Int. Cl.[7] ......................... H04N 5/262; H04N 5/232
(52) U.S. Cl. .................... 348/347; 348/240.3; 348/351; 348/360
(58) Field of Search ................................ 348/345, 347, 348/349, 350, 351, 354, 355, 356, 357, 358; 359/694, 697, 698, 700; 396/79–82, 85–87, 91, 93, 103, 133, 135, 136, 137; G03B 13/00; H04N 5/225

(56) References Cited

U.S. PATENT DOCUMENTS

| 4,735,494 | A | * | 4/1988 | Makino | 348/347 |
| 4,994,842 | A | * | 2/1991 | Itoh | 348/347 |
| 5,113,214 | A | | 5/1992 | Nagata et al. | 396/78 |
| 5,296,970 | A | | 3/1994 | Morizumi | 359/700 |
| 5,323,200 | A | * | 6/1994 | Hirasawa | 396/81 |
| 5,786,853 | A | * | 7/1998 | Ohkawara | 348/358 |
| 5,790,902 | A | * | 8/1998 | Mizouchi | 396/142 |
| 5,949,586 | A | * | 9/1999 | Hirasawa | 359/698 |
| 5,956,528 | A | * | 9/1999 | Tanaka | 348/347 |

FOREIGN PATENT DOCUMENTS

| EP | 0394901 | 10/1990 | ............ G02B/7/10 |
| EP | 0407914 | 1/1991 | ............ G02B/7/10 |
| EP | 0579404 | 1/1994 | ............ G02B/7/10 |
| EP | 0660597 | 6/1995 | .......... G04N/5/232 |

\* cited by examiner

Primary Examiner—Ngoc-Yen Vu
(74) Attorney, Agent, or Firm—Robin, Blecker & Daley

(57) ABSTRACT

A lens control device comprising a variator lens, a compensation lens for compensating for the displacement of the focal plane associated with the movement of the variator lens, a conversion lens disposed in an optical path in a detachable manner for limiting the area of the movement of the variator lens, and correction means for modifying the area of the movement of the compensation lens in response to the mounting of the conversion lens.

13 Claims, 24 Drawing Sheets

$$a_x = a_k - \frac{(z_k - z_x)(a_k - a_{k-1})}{(z_k - z_{k-1})}$$

$$b_x = b_k - \frac{(z_k - z_x)(b_k - b_{k-1})}{(z_k - z_{k-1})}$$

| n\v | 0 | 1 | 2 | 3 | ...... | k | ...... | m |
|---|---|---|---|---|---|---|---|---|
| 0 | A00 | A10 | A20 | A30 | ...... | Ak0 | ...... | Am0 |
| 1 | A01 | A11 | A21 | A31 | ...... | Ak1 | ...... | Am1 |
| 2 | A02 | A12 | A22 | A32 | ...... | Ak2 | ...... | Am2 |
| 3 | A03 | A13 | A23 | A33 | ...... | Ak3 | ...... | Am3 |
| ⋮ | ⋮ | ⋮ | ⋮ | ⋮ | ⋮ | ⋮ | ⋮ | ⋮ |
| k | A0k | A1k | A2k | A3k | ...... | Akk | ...... | Amk |
| ⋮ | ⋮ | ⋮ | ⋮ | ⋮ | ⋮ | ⋮ | ⋮ | ⋮ |
| s | A0s | A1s | A2s | A3s | ...... | Aks | ...... | Ams |

| n\v | 0 | 1 | 2 | 3 | ...... | k | ...... | m |
|---|---|---|---|---|---|---|---|---|
| 0 | B00 | B10 | B20 | B30 | ...... | Bk0 | ...... | Bm0 |
| 1 | B01 | B11 | B21 | B31 | ...... | Bk1 | ...... | Bm1 |
| 2 | B02 | B12 | B22 | B32 | ...... | Bk2 | ...... | Bm2 |
| 3 | B03 | B13 | B23 | B33 | ...... | Bk3 | ...... | Bm3 |
| ⋮ | ⋮ | ⋮ | ⋮ | ⋮ | ⋮ | ⋮ | ⋮ | ⋮ |
| k | B0k | B1k | B2k | B3k | ...... | Bkk | ...... | Bmk |
| ⋮ | ⋮ | ⋮ | ⋮ | ⋮ | ⋮ | ⋮ | ⋮ | ⋮ |
| t | B0t | B1t | B2t | B3t | ...... | Bkt | ...... | Bmt |

LENS CONTROL DEVICE FOR MOVING RANGE CORRECTION

This is a continuation of prior application Ser. No. 08/417,928, filed Apr. 6, 1995 now abandoned.

BACKGROUND OF THE INVENTION

1. Field of the Invention

The present invention relates to a camera which is provided with a zoom lens and a lens capable of being mounted onto the zoom lens in a detachable manner to modify the focal length and magnifying power of the zoom lens.

2. Description of the Related Art

Conventionally available as one type of camera is the one provided with a zoom lens and a conversion lens which is mounted onto the zoom lens in a detachable manner to modify the focal length and power of the zoom lens.

Referring to drawings, the conventional arrangement of the zoom lens and the conversion lens which is mounted onto the zoom lens in a detachable manner to modify the focal length and magnification of the zoom lens is discussed below. FIG. 1 is a diagrammatic view showing the arrangement of a conventional camera comprising a zoom lens and a conversion lens which is mounted onto the zoom lens to modify the focal length and power of the zoom lens.

A zoom lens unit 100 comprises a first (front) lens group 101 mounted onto a lens casing as shown in FIG. 1. Disposed behind the first lens group 101 is a second lens group (hereinafter referred to as "a variator lens") 102 for varying power. The variator lens 102 shares the same optical axis with the first lens group 101. To vary its power, the variator lens 102 is moved in a direction in parallel with the optical axis of its own by driving means (not shown).

An iris 103 is disposed behind the variator lens 102 to adjust light quantity. Disposed further behind the iris 103 is a third lens group 104 that is attached onto the lens casing. The third lens group 104 also shares the same optical axis with the variator lens 102.

Arranged behind the third lens group 104 is a fourth lens group (hereinafter referred to as "a focus-compensation lens") 105. The focus-compensation lens 105 has a focusing function, and a compensation function, namely compensating for the displacement of the focal plane arising from power variation. The focus-compensation lens 105 shares the same optical axis with the third lens group 104. The focus-compensation lens 105 is moved in a direction in parallel with the optical axis of its own by the driving means so that the focusing and compensation are performed.

An image pickup device 106 such as a CCD is arranged behind the zoom lens unit 100, namely the focus-compensation lens 105. An imaging surface that bears an optical image of an object is provided on one side of the CCD 106 facing the focus-compensation lens 105.

A wide-angle attachment lens 121 is mounted onto the zoom lens unit 100 in a detachable manner to modify the focal length and power of the lens unit 100. When mounted onto the zoom lens unit 100, the wide-angle attachment lens 121 is positioned in front of the first lens group 101 in a manner that allows the optical axes of both are aligned. The mounting of the wide-angle attachment lens 121 causes the focal length of the zoom lens unit 100 to shift toward the wide-angle side.

Discussed below referring to drawings are a relationship between the focal length (the position of the variator lens 102) of the zoom lens unit 100 and the position of the focus-compensation lens 105 with no wide-angle attachment lens 121 mounted and a similar relationship but with the wide-angle attachment lens 121 mounted. FIGS. 2(a) and 2(b) illustrate, respectively, the relationship between the focal length (the position of the variator lens 102) of the zoom lens unit 100 and the position of the focus-compensation lens 105 with no wide-angle attachment lens 121 mounted and the same relationship but with the wide-angle attachment lens 121 mounted in FIG. 1. FIG. 3 shows the relationship between the position of the variator lens and the position of the focus-compensation lens with no wide-angle attachment lens mounted in FIG. 1. FIG. 4 shows a similar relationship.

A discussion of the relationship between the focal length (the position of the variator lens 102) of the zoom lens unit 100 and the position of the focus-compensation lens 105 with no wide-angle attachment lens mounted follows.

When the focal length of the zoom lens unit 100 is set to a predetermined value, the position of the focus-compensation lens 105 that results in an optical image on the imaging surface of the CCD 106, namely, the focused position of the focus-compensation lens 105 varies with the distance to the object as shown in FIG. 2(a). When the object distance remains constant, the focused position of the focus-compensation lens 105 varies with the focal length of the zoom lens unit 100, namely, the position of the variator lens 102. As a result, an optical image is obtained through the light which is focused by shifting the focus-compensation lens 105 according to the curve resulting from the focal length set and the object distance.

A discussion of how to follow the above-mentioned curve follows.

Referring to FIG. 3, the relationship between the focal length (the position of the variator lens 102) of the zoom lens unit 100 and the position of the focus-compensation lens 105 with no wide-angle attachment lens 121 mounted is illustrated by a first curve f1 that is a plot of a series of positions of the variator lens 102, z0, z1, z2, . . . , z6 versus a corresponding series of positions of the focus-compensation lens 105, a0, a1, a2, . . . , a6. Data, z0, z1, z2, . . . , z6 and a0, a1, a2, . . . a6, are stored in a lens control microcomputer (not shown). Equally, a second curve f2 is a plot of a series of positions of the variator lens 102, z0, z1, z2, . . . , z6 versus a corresponding series of positions of the focus-compensation lens 105, b0, b1, b2, . . . , b6. These data are also stored in the lens control microcomputer.

A third curve f3, however, is calculated from the first curve f1 and the second curve f2. The third curve f3 is a plot of a series of positions of the variator lens 102, z0, z1, z2, . . . , z6 versus a corresponding series of positions of the focus-compensation lens 105, p0, p1, p2, . . . , p6. These data are also stored in the lens control microcomputer.

p0, p1, p2, . . . , p6 are calculated by the following equation.

$$p(n+1)=\{|p(n)-a(n)|/|b(n)-a(n)|\}*\{|b(n+1)-a(n+1)|\}+a(n+1) \quad (1)$$

Equation (1) determines the ratio of interior division of p0 on a line segment, b0–a0, when the focus-compensation lens 105 is positioned at p0. According to the ratio, p1 is plotted on a line segment, b1–a1. The speed of the focus-compensation lens 105 required to keep the zoom lens unit 100 focused is thus determined by the positional difference between p1 and p0 and the time the variator lens 102 requires to travel from z0 to z1.

Referring to FIG. 4, interpolation applied to the variator lens 102 in its one direction is discussed. In FIG. 4, the position of the variator lens 102 is arbitrarily set, and representative (cam) locus (the positions of the focus-compensation lens relative to the variator lens) is a plot of the positions of the variator lens 102, z0, z1, z2, ..., zn and a0, a1, a2, ..., an, and b0, b1, b2, ..., bn relative to the object distance.

When the variator lens 102 is positioned at zx, not on any of the zooming boundaries represented by z0, z1, z2, ..., zn within the range of travel of the variator lens 102 (namely, somewhere between zk−1 and zk) and when the focus-compensation lens 105 is positioned at px, both ax and bx are given by the following equations.

$$ax = ak - (zk-zx)*(ak-ak-1)/(zk-zk-1) \quad (2)$$

$$bx = bk - (zk-zx)*(bk-bk-1)/(zk-zk-1) \quad (3)$$

As understood from the above equations, ax and bx are determined by interpolating, respectively, between two sets of stored representative locus data (ak, and ak−1, and bk, and bk−1 in FIG. 4) with respect to a fixed object distance according to the interior division ratios obtained from two sets of zooming boundaries (for example, zk and zk−1 in FIG. 4) and the position of the variator lens 102 between zk and zk−1.

As understood from Equation (1), both pk and pk−1 are determined by interpolating, respectively, two sets of stored representative locus data (ak, ak−1, bk, and bk−1 in FIG. 4) with respect to a fixed focal length according to the interior division ratio obtained from ax, px, and bx.

The travel speed of the focus-compensation lens 105 required to keep the zoom lens unit 100 focused is determined by the position difference between a focused position to be followed and the currently focused position in the zooming operation from a wide-angle side to a telephoto side and the time the variator lens 102 requires to travel from zx to zk.

The zoom lens unit 100 thus follows the curve representing the relationship between the focal length (the position of the variator lens 102) of the zoom lens unit 100 and the position of the focus-compensation lens 105 with no wide-angle attachment lens 121 mounted.

The relationship between the focal length (the position of the variator lens 102) of the zoom lens unit 100 and the position of the focus-compensation lens 105 with the wide-angle attachment lens 121 mounted is now discussed.

When the focal length of the zoom lens unit 100 is set to a predetermined value, the focused position of the focus-compensation lens 105 varies with the object distance as shown in FIG. 2(b). With the object distance kept constant, the focused position of the focus-compensation lens 105 varies with the focal length, namely with the position of the variator lens 102 (along a locus). As can be seen from FIG. 2(b), however, the curve representing the relationship, in terms of object distance as parameter, between the focal length and the position of the focus-compensation lens 105 is different from the curve representing the relationship, in terms of object distance as parameter, between the focal length and the position of the focus-compensation lens 105 with no wide-angle attachment lens 121 mounted. In FIG. 2(b), if the focal length exceeds a limit 301, the curves representing the relationship, in terms of object distance as parameter, between the focal length and the position of the focus-compensation lens 105 diverge out of the focusable focal length area. If the focal length is kept to within the limit 301, namely, the focal length is set to any value closer to the wide-angle side, focus adjustment by means of the focus-compensation lens 105 remains workable. If the focal length exceeds the limit 301, however, namely, the focal length is set to any value closer to the telephoto side, focus adjustment by means of the focus-compensation lens 105 is impossible. To cope with this problem, the variator lens 102 is moved until the focal length is set to be closer to the wide-angle side, and is fixed there. Therefore, the variator lens 102 is fixed at such a predetermined position, and zooming operation is disabled when the wide-angle attachment lens 121 is mounted.

When the variator lens 102 is set to the fixed position with the wide-angle attachment lens 121 mounted, the resulting curve representing the relationship, in terms of object distance as parameter, between the focal length (the position of the variator lens 102) and the position of the focus-compensation lens 105 differs from the curve representing the relationship, in terms of object distance as parameter, between the focal length (the position of the variator lens 102) and the position of the focus-compensation lens 105 with the wide-angle attachment lens 121 mounted. The focus adjustment operation cannot follow the movement of the variator lens 102, and keeping the zoom lens unit focused cannot be attained. As a result, the zoom lens unit suffers from a noticeably unfocused state until the variator lens 102 reaches the fixed position, and thereafter the zoom lens unit takes a substantially long time to reach a focused position from the arrival of the variator lens 102 at the fixed position.

When the wide-angle attachment lens 121 is mounted with the zoom lens unit 100 positioned closer to the telephoto side, the variator lens 102 is forced to move closer to the wide-angle side. In the course of this movement, an unfocused state takes place.

The variator lens 102 is forced to move closer to the wide-angle side when power is switched on with the wide-angle attachment lens 121 mounted onto the zoom lens unit 100. Thus, an unfocused image output and varied field of view result during the forced movement of the variator lens 102. If the mounting of the wide-angle attachment lens 121 goes unnoticed, these may be confusing to an operator.

SUMMARY OF THE INVENTION

It is a first object of the present invention to provide a camera which performs a forced zooming operation with a conversion lens group such as a wide-angle attachment lens mounted while keeping a focused state and offers an improved response characteristic in automatic focus adjustment.

To achieve the above object, according to a preferred embodiment of the present invention, a lens control device comprises a zoom lens unit having a variator lens group and a focus-compensation lens group which compensates for in a focused position a variation arising from power variation operation of the variator lens group, a conversion lens group which is mounted in an optical axis of the zoom lens unit in a detachable manner, and which restricts a focusable focal length area of the zoom lens unit to a second focal length area by shifting from a first focal length area while the conversion lens group is mounted, lens position control means for determining a focused position of the focus-compensation lens group while the variator lens group is moving, on the basis of both focused position data, predetermined according to object distance, of the focus-compensation lens group relative to the variator lens group and current position data of the focus compensation lens group and the variator lens group, and correction means for shifting the variator lens group to the second focal length area when the variator lens group is mounted in the optical axis of the zoom lens unit, and compensating for the focused position of the focus-compensation lens group in accordance with the shifting of the variator lens group to the second focal length area to follow the variator lens group.

It is a second object of the present invention to provide a lens control device and a camera, both of which avoid an operator's confusion attributed to the fact that the mounting of a conversion lens group such as a wide-angle attachment lens goes unnoticed, and both of which offer an improved image quality and improved automatic focus adjustment performance.

To achieve the second object, according to a preferred embodiment of the present invention, a lens control device or a camera comprises a zoom lens unit having a variator lens group and a compensation lens group which compensates for in a focused position a variation arising from power variation operation of the variator lens group, a conversion lens group which is mounted in an optical axis of the zoom lens unit in a detachable manner, and which shifts a focusable focal length area of the zoom lens unit to a second focal length area from a first focal length area while the conversion lens group is mounted, position detecting means for detecting a position of the compensation lens group on the basis of a predetermined reference position, and reference position shifting means for shifting the predetermined reference position to a reference position corresponding to the second focal length area when the conversion lens group is mounted on the zoom lens unit.

It is a third object of the present invention to perform optimum control by compensating for in optical characteristics a variation resulting from the mounting of accessories.

It is a fourth object of the present invention to provide a camera which prevents a degraded quality image from being output for its initial setting, during which a variation involved in the mounting of accessories in optical characteristics is compensated for.

These and other objects and features of the present invention will be more apparent when the following detailed description is considered with the attached drawings.

BRIEF DESCRIPTION OF THE DRAWINGS

FIGS. 9(a) and 9(b) are tables, each listing representative values representing the relationship between the focal length (the position of the variator lens) of the zoom lens unit and the position of the focus-compensation lens with no wide-angle attachment lens mounted and the same relationship but with the wide-angle attachment lens mounted in FIG. 5.

DETAILED DESCRIPTION OF THE PREFERRED EMBODIMENTS

Figure 1:
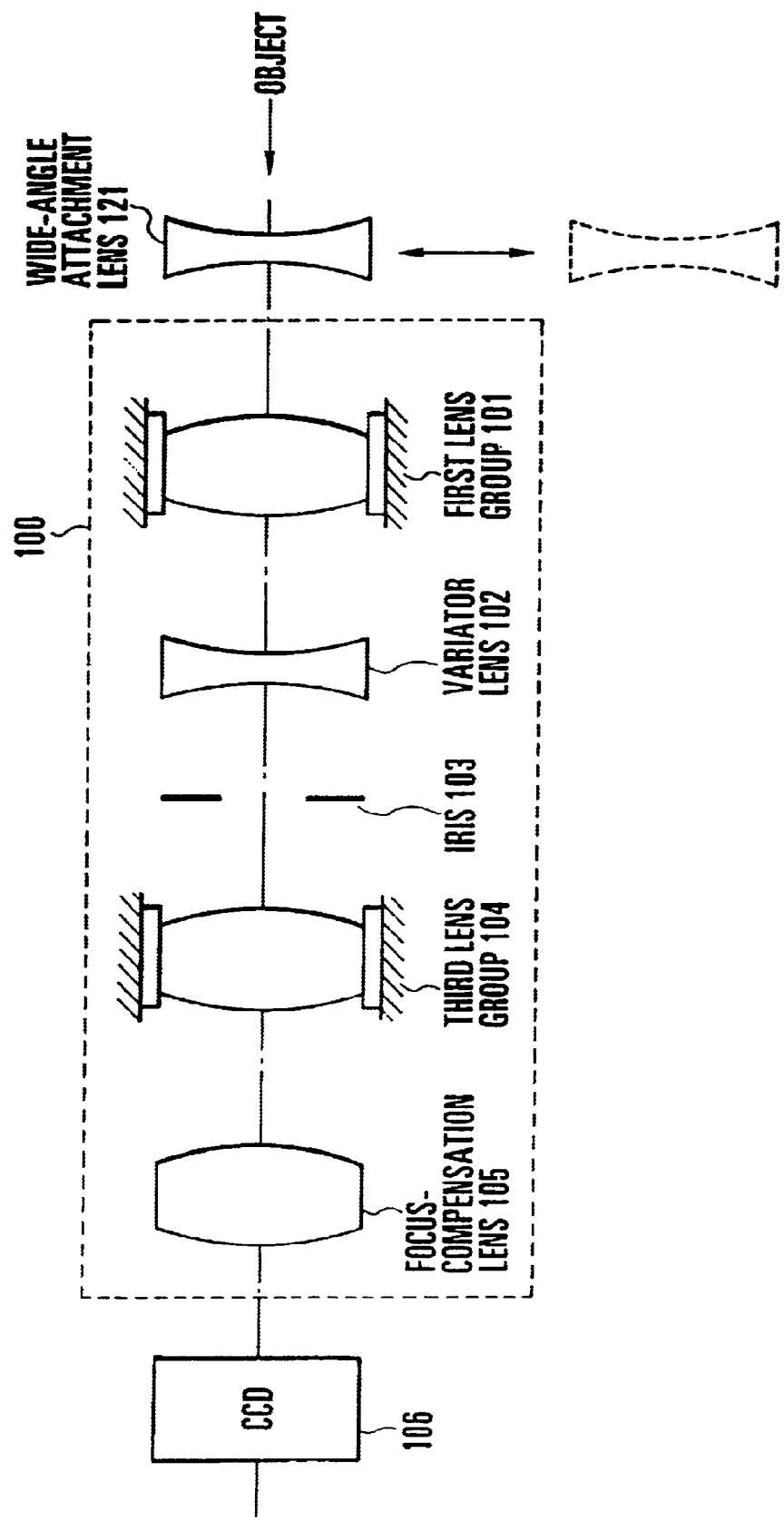
FIG. 1 is a diagrammatic view showing the arrangement of a conventional camera comprising a zoom lens unit and a conversion lens which is mounted onto the zoom lens to modify the focal length and power of the zoom lens unit.

Referring now to the drawings, the embodiments of the lens control device according to the present invention are discussed.

(First Embodiment)

Figure 5:
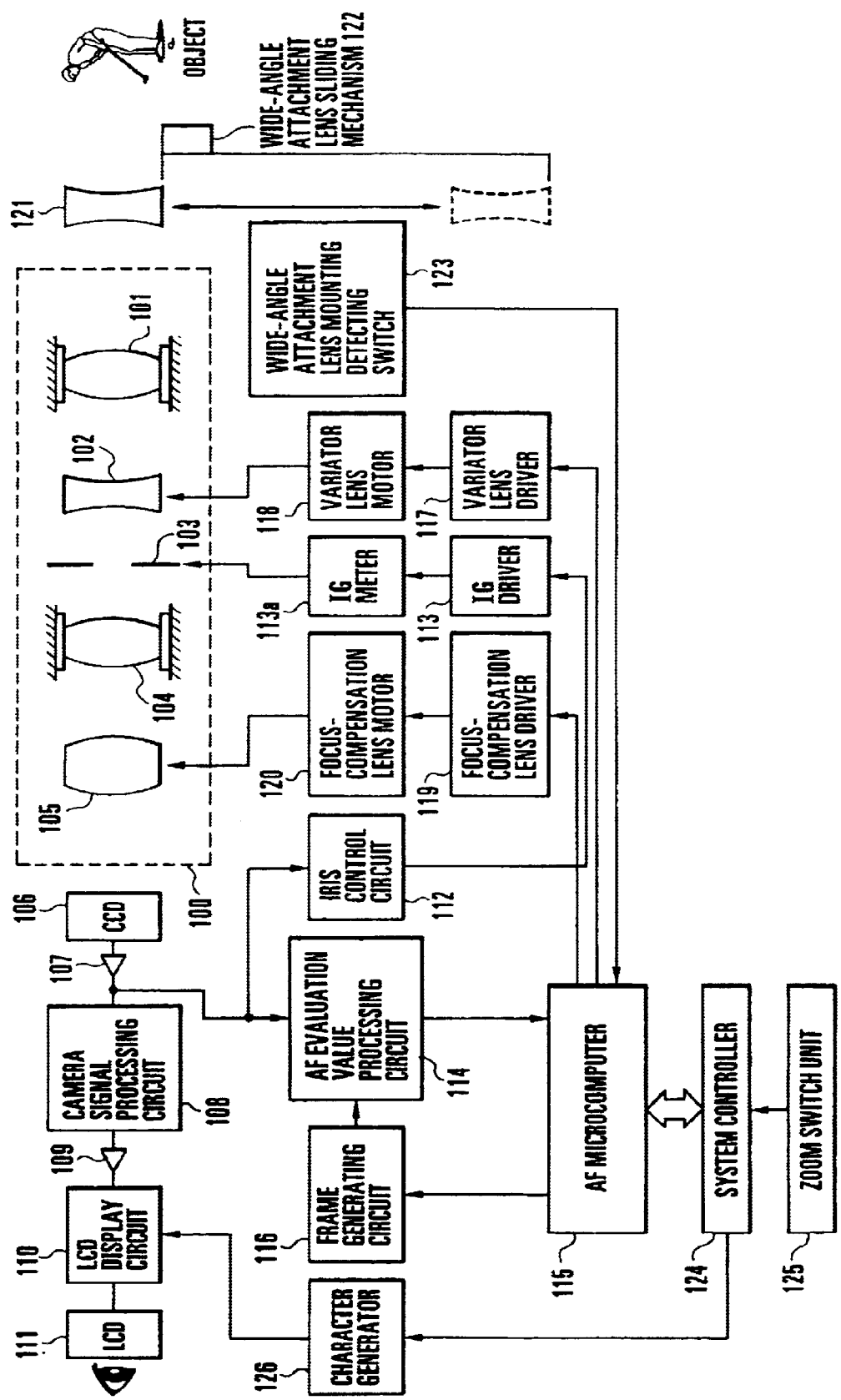
FIG. 5 is a block diagram showing the lens control device according to a first embodiment of the present invention.

FIG. 5 is the block diagram showing the construction of a video camera into which the lens control device of the present invention is implemented.

As shown in FIG. 5, the camera in this embodiment is provided with a zoom lens unit 100 that is capable of adjusting its focal length within a first focal length area and power within a range from 1× to 12×. The zoom lens unit 100, as shown, comprises a first lens group 101. Disposed behind the first lens group 101 is a second lens group (hereinafter referred to as "a variator lens") 102 which shares the same optical axis with the first lens group 101.

The variator lens 102 is shifted along the optical axis of its own by a variator lens motor 118 to modify its power. The variator lens motor 118 is of a stepping motor type.

An iris 103 is disposed behind the variator lens 102 to adjust light quantity. Disposed further behind the iris 103 is a third lens group 104 that is attached onto the lens casing. The third lens group 104 also shares the same optical axis with the variator lens 102.

Arranged behind the third lens group 104 is a fourth lens group (hereinafter referred to as "a focus-compensation lens") 105. The focus-compensation lens 105 has a focusing function, and a compensation function, namely compensating for the displacement of the focal plane arising from power variation. The focus-compensation lens 105 shares the same optical axis with the third lens group 104.

The focus-compensation lens 105 is moved in the direction in parallel with the optical axis of its own by a focus-compensation lens motor 120 so that the focusing and compensation functions are performed. The focus-compensation lens 120 is of a stepping motor type.

An image pickup device 106 such as a CCD is arranged behind the zoom lens unit 100, namely, behind the focus-compensation lens 105. An imaging surface that bears an optical image of an object is provided on one side of the CCD 106 facing the focus-compensation lens 105.

CCD 106 photoelectrically converts an optical image borne on its imaging surface into a video signal, which, after being amplified by an amplifier 107, is fed to a camera signal processing circuit 108, an AF evaluation value processing circuit 114, and an iris control circuit 112.

The camera-signal processing circuit 108 performs a predetermined processing to the input video signal to convert it into a standardized video signal, and then outputs it. The video signal from the camera signal processing circuit 108 is amplified by an amplifier 109 up to a predetermined level to be fed to an LCD display circuit 110. The LCD display circuit 110 performs a predetermined processing to the input video signal before it is fed to an LCD 111. The LCD 111 is a liquid crystal display device, which presents characters representing photographing information derived from a character generator 126 along with the image represented by the video signal.

The iris control circuit 112 generates a control signal that controls openness of the iris 103 in accordance with the level of input video signal. The control signal from the iris control circuit 112 is fed to an IG driver 113. In response to the control signal, the IG driver 113 drives its IG meter 113a. With the IG meter 113a driven, openness of the iris 103 is controlled so that the level of video signal remains constant. Light quantity is thus adjusted.

The AF evaluation processing circuit 114 extracts a high frequency component from video signal within a distance measurement frame, based on a gate signal from a frame generating circuit 116, and uses the extracted high frequency component to generate an AF evaluation signal that represents the degree of focus matching.

The AF evaluation signal generated by the AF evaluation value processing circuit 114 is sent to an AF control microcomputer (hereinafter referred to as AF microcomputer) 115. The AF microcomputer 115 has the general control over the lens driving. The AF microcomputer 115 receives a detection signal from a wide-angle attachment lens mounting detecting switch 123. In response to the detection signal and the AF evaluation signal, the AF microcomputer 115 generates the control signal for shifting the variator lens 102, the control signal for shifting the focus-compensation lens 105, and a command signal instructing a change of distance measurement frame. The control signal for shifting the variator lens 102 is fed to a variator lens driver 117, the control signal for shifting the focus-compensation lens 105 is fed to a focus-compensation lens driver 119, and the command signal instructing a change of distance measurement frame is fed to the frame generating circuit 116.

In response to the control signal from the AF microcomputer 115, the variator lens driver 117 drives the variator lens motor 118. With the variator lens motor 118 driven, the variator lens 102 is moved along its optical axis.

In response to the control signal from the AF microcomputer 115, the focus-compensation lens driver 119 drives the focus-compensation motor 120 to move the focus-compensation lens 105 along its optical axis.

The AF microcomputer 115 is connected to a system controller 124 through a bidirectional line. The system controller 124, having a microcomputer, has a general control over the operation of the video camera. The system controller 124 receives focal length information of the current setting in a zoom switch unit 125 in connection with the zoom lens unit 100, and power variation information such as zoom driving direction and focal length provided by the AF microcomputer 115. Furthermore, the system controller 124 controls the character generator 126 to present photographing information such as zoom information. The photographing information is superimposed on the video signal to be presented on LCD 111.

The zoom switch unit 125 outputs, as the above-mentioned focal length information, a voltage corresponding to an angle of rotation of an operation member (not shown) which performs a zoom operation to the zoom lens unit 100.

Exchanged between the system controller 124 and the AF microcomputer 115 are the above-mentioned focal length information and the power variation information such zoom driving direction and focal length generated by the AF microcomputer 115.

A wide-angle attachment lens 121 is mounted onto the zoom lens unit 100 in a detachable manner to adjust its focal length and power. When mounted, the wide-angle-attachment lens 121 is positioned in front of the first lens group 101 so that the optical axis of the wide-angle attachment lens 121 is aligned with that of the first lens group 101. With the wide-angle attachment lens 121 mounted, the focusable focal length area of the zoom lens unit 100 is shifted to a second focal length area from-the first focal length area, the focal length of the zoom lens unit 100 is shifted toward the wide-angle side, and its power is switched to within a range from 0.7× to 1×.

The mounting of the wide-angle attachment lens 121 onto the zoom lens unit 100 is performed using a wide-angle attachment lens sliding mechanism 122. The presence or absence of the wide-angle attachment lens 121 is detected by the wide-angle attachment lens mounting detecting switch 123. The detection signal indicative of the presence or absence of the wide-angle attachment lens 121 is sent to the AF microcomputer 115.

Referring now to drawings, the operation of the camera in this embodiment is discussed.

Figure 6:
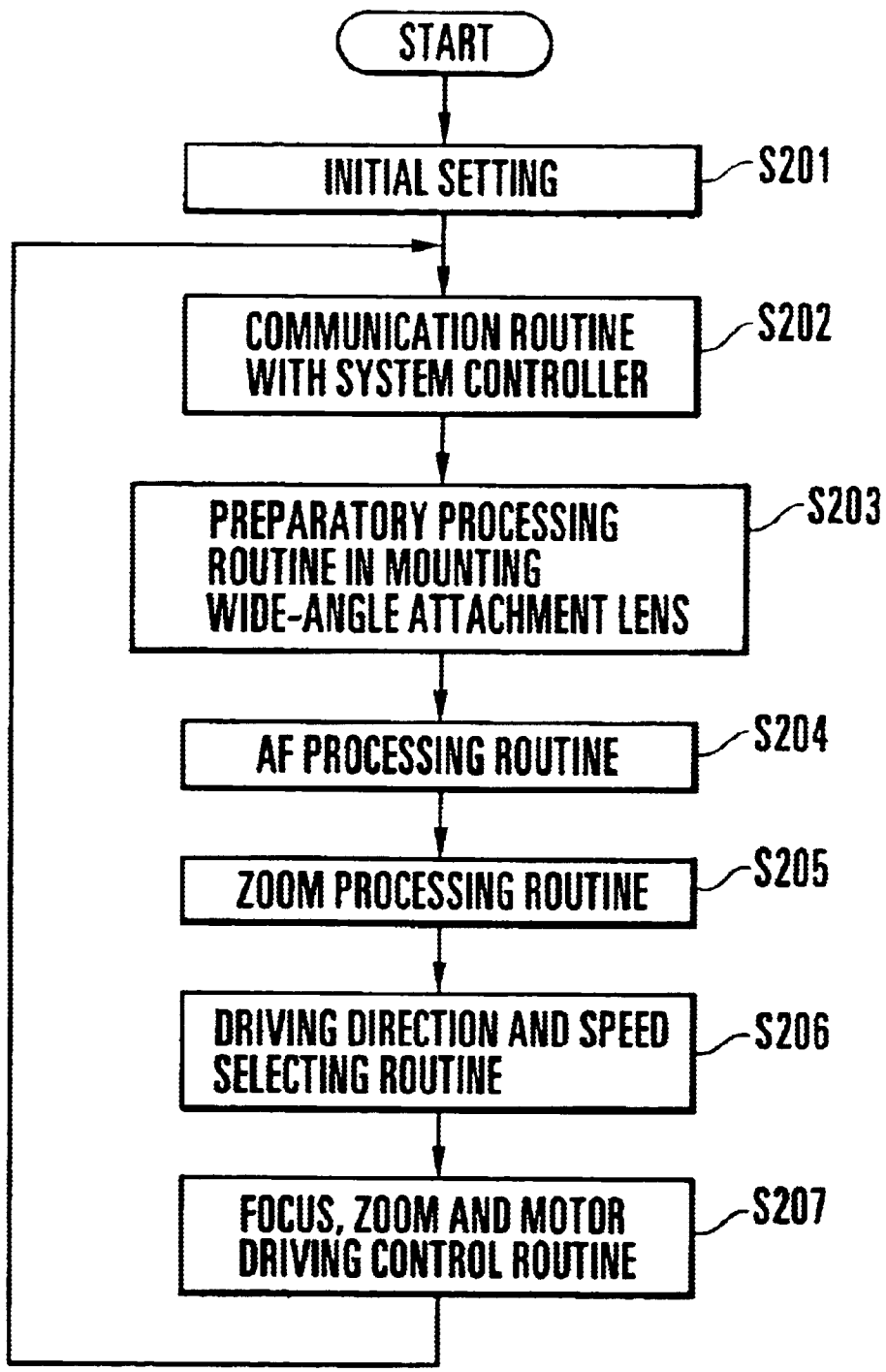
FIG. 6 is a flow diagram showing the control operation of the lens control device of FIG. 5.

FIGS. 5 and 6 are flow diagrams showing the control operation of the camera. The processing illustrated herein is executed in the AF microcomputer 115.

As shown in FIG. 6, the initial setting is performed at the start of the processing (step S201). In the initial setting, the RAM and the variety of ports at the AF microcomputer 115 are initialized.

Then, a communication routine follows (step S202). Exchanged in the communication routine between the AF microcomputer 115 and the system controller 124 are the focal length information such as the operational information of the zoom switch unit 125 and the position of the variator lens, the direction in which the variator lens is driven under the zoom control of the AF microcomputer 115, namely the zoom driving direction, and information indicative of the operative zoom driving area which is changed according to the presence or absence of the wide-angle attachment lens 121 on the zoom lens unit 100. In response to each signal, the system controller 124 controls the character generator 126 in order to present each necessary pieces of information on LCD 111.

The communication routine is followed by a preparatory processing routine for mounting the wide-angle attachment lens (step S203). In the preparatory processing routine for mounting the wide-angle attachment lens, the focal length of the zoom lens unit 100, namely the position of the variator lens, is forced to move to within the focusable focal length area with the wide-angle attachment lens 121 mounted. This process will be discussed further in detail.

Next, the AF processing routine takes place (step S204). In the AF processing routine, several operations such as integrating operation, peak detection, difference calculus are performed to the AF evaluation signals such as high frequency components, and automatic focus adjustment is performed based on variations in the AF evaluation signals.

Figure 2A:
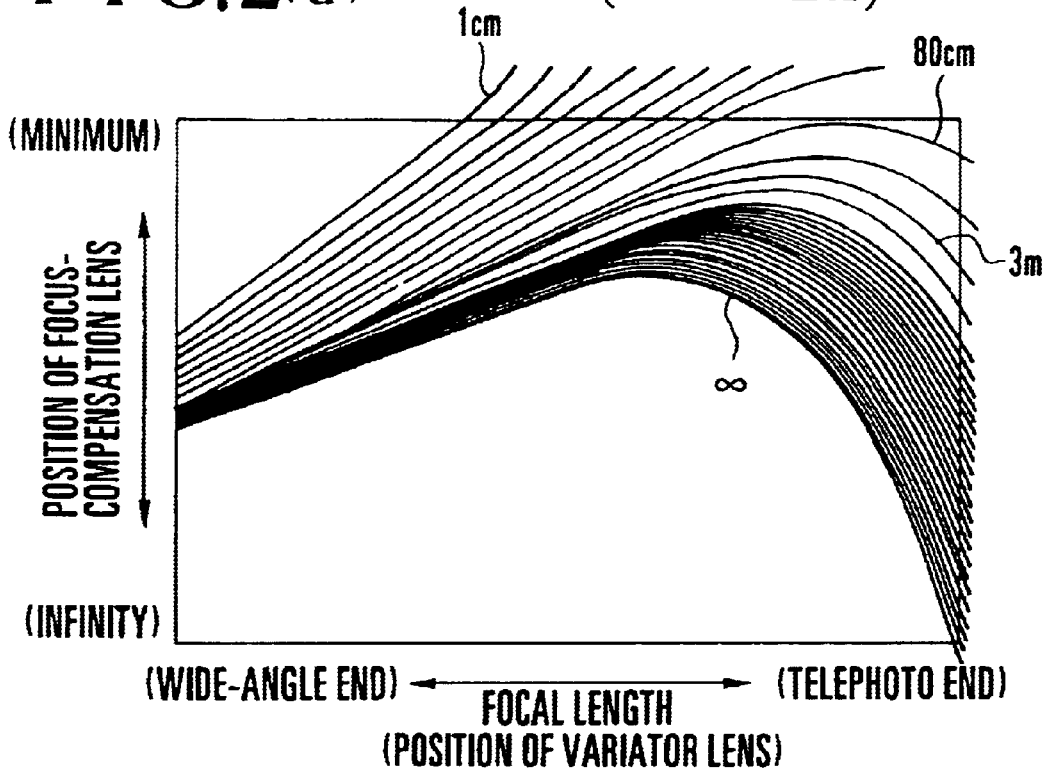
FIGS. 2(a) and 2(b) illustrate, respectively, the relationship between the focal length (the position of the variator lens) of the zoom lens unit and the position of the focus-compensation lens with no wide-angle attachment lens mounted and the same relationship but with the wide-angle attachment lens mounted in FIG. 1.
Figure 2B:
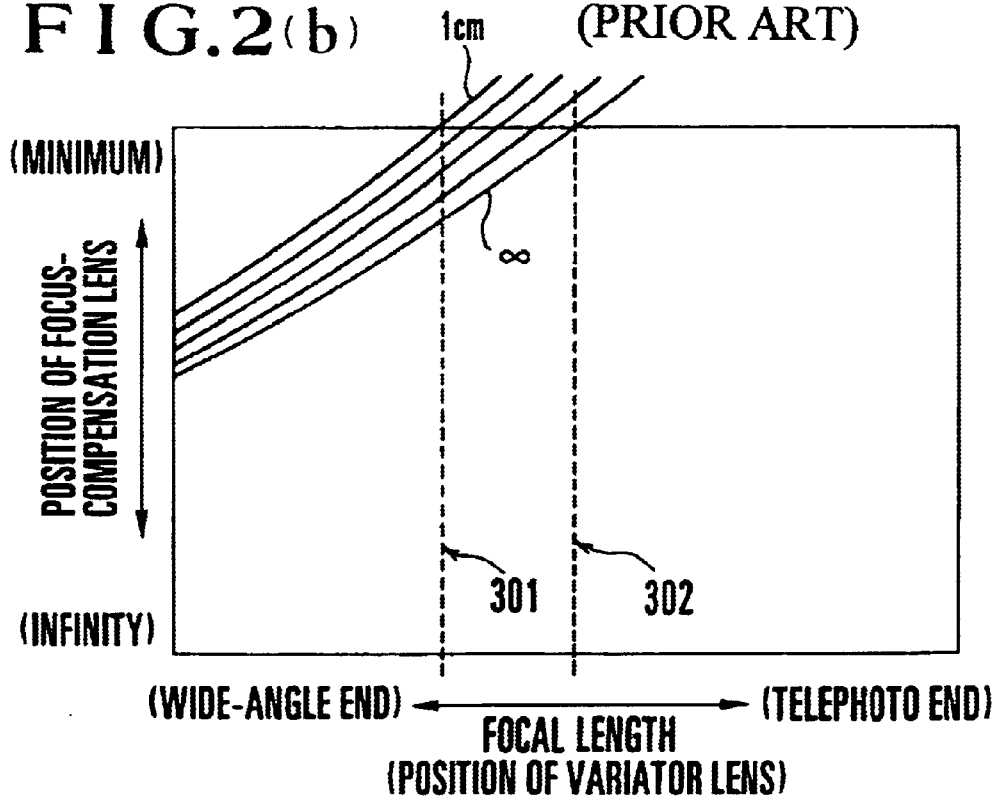

The AF processing routine is followed by a zoom processing routine (step S205) which performs compensation function to keep a focused state during zooming operation. In the zoom processing routine, the zoom driving direction and speed of the focus-compensation lens 105 are calculated to follow the cam locus as shown in FIGS. 2(a) and 2(b).

The zoom processing routine is followed by a driving direction and speed selecting routine (step S206). In this routine, in accordance with each of forced movement operation with the wide-angle attachment lens mounted, AF mode (automatic focus mode) operation, and power variation operation, driving direction and speed are selected from driving direction and speed of the variator lens 102 and driving direction and speed of the focus-compensation lens 105, determined in steps S203 and S204. Each of the variator lens and the focus-compensation lens has its own range of travel terminated with both mechanical ends. Provided in the vicinity of each mechanical end is an electrical end or software end. By setting the driving directions and speeds for the variator lens and the focus-compensation lens, the variator lens is prevented from being positioned beyond the electrical telephoto end toward the mechanical telephoto end or beyond the electrical wide-angle end toward the mechanical wide-angle end, and the focus-compensation lens is prevented from being positioned beyond the electrical minimum end toward the mechanical minimum end or beyond the electrical infinity end toward the mechanical infinity end.

The driving direction and speed selecting routine (step S206) is followed by a focus, zoom and motor driving control routine (step S207). In this routine, in response to the selected driving direction and speed of the variator lens 102 and the selected driving direction and speed of the focus-compensation lens 105, the control signal for the variator lens driver 117 and the control signal for the focus-compensation lens driver 119 are generated to control the variator lens 102 and the focus-compensation lens 105 in driving or stopping operation.

The program returns back to step S202 to perform it thereafter again after the focus, zoom and motor driving control routine. The above series of steps are performed in synchronism with a vertical synchronization interval. The start of step S202 waits for a next vertical synchronizing signal.

Figure 7:
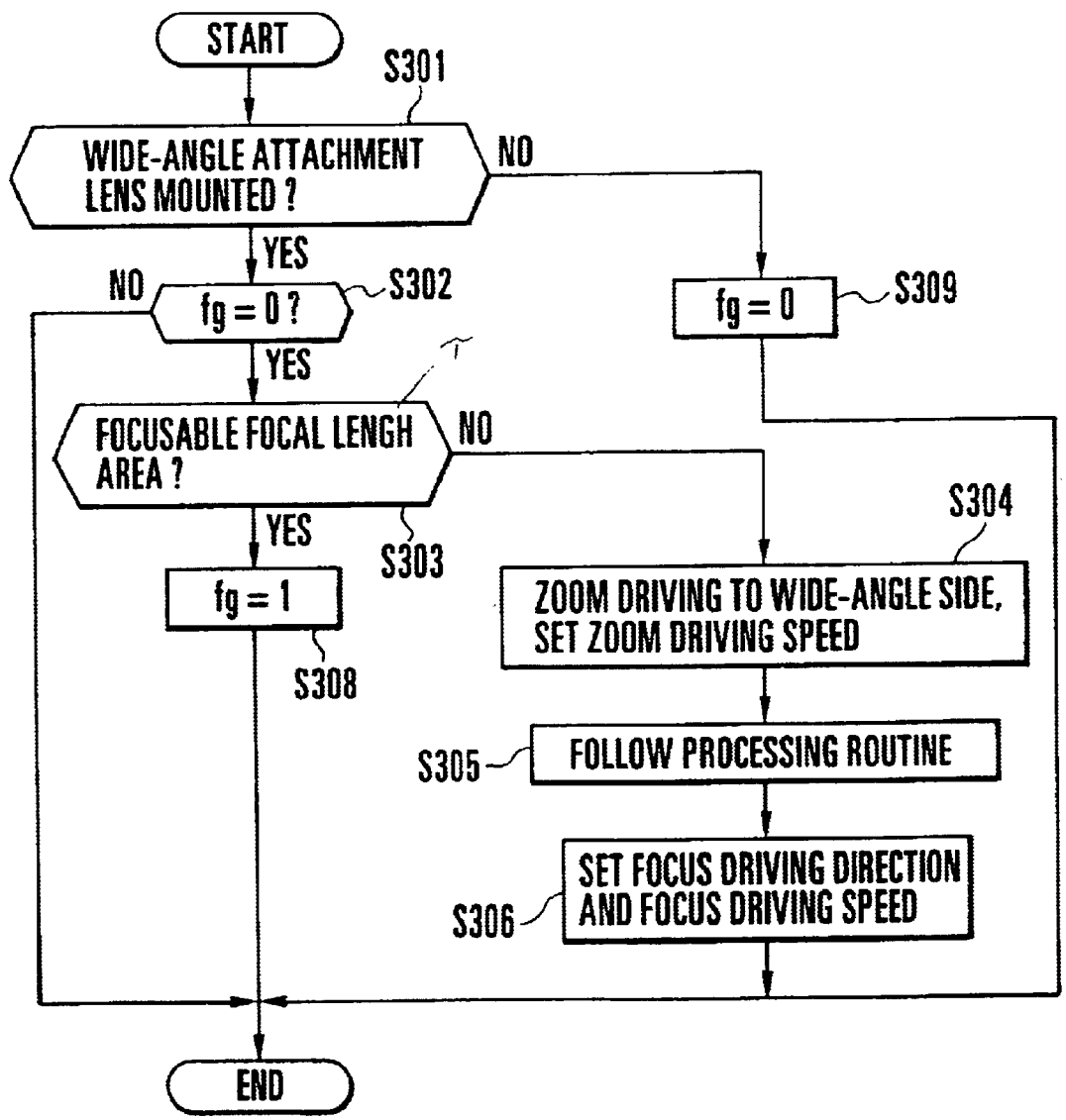
FIG. 7 is a flow diagram showing the preparatory processing routine when the wide-angle attachment lens is mounted in the camera of FIG. 5.
Figure 8:
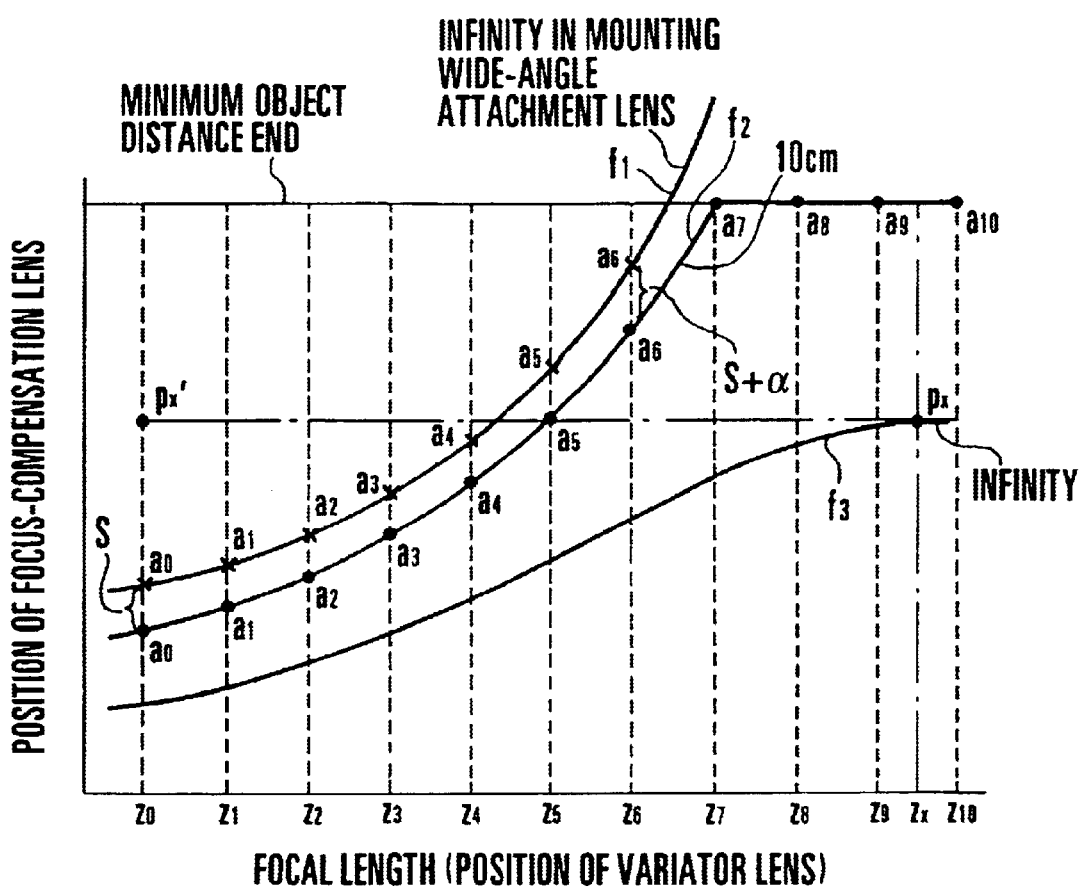
FIG. 8 illustrates the relationship between the focal length (the position of the variator lens) of the zoom lens unit and the position of the focus-compensation lens with no wide-angle attachment lens mounted and the same relationship but with the wide-angle attachment lens mounted in FIG. 5.

Referring to drawings, the preparatory processing routine in mounting the wide-angle attachment lens is discussed. This routine forces the variator lens to move to within the focusable focal length area when the wide-angle attachment lens is mounted. FIG. 7 is the flow diagram showing the preparatory processing routine when the wide-angle attachment lens is mounted in the camera of FIG. 5. FIG. 8 illustrates the relationship between the focal length (the position of the variator lens) of the zoom lens unit and the position of the focus-compensation lens with no wide-angle attachment lens mounted and the same relationship but with the wide-angle attachment lens mounted in FIG. 5. FIGS. 9(a) and 9(b) are tables, each listing representative values representing the relationship between the focal length (the position of the variator lens) of the zoom lens unit and the position of the focus-compensation lens with no wide-angle attachment lens mounted and the same relationship but with the wide-angle attachment lens mounted in FIG. 5.

To execute the preparatory processing routine in mounting the wide-angle attachment lens, a determination is made of whether the wide-angle attachment lens 121 is mounted or not (step S301) as shown in FIG. 7. When the wide-angle attachment lens 121 is mounted, a determination is made of whether a preparation end flag fg is raised or not (step S302). When the preparation end flag fg is "1," the processing ends assuming that the preparatory processing is complete.

The preparation end flag fg is raised to "1" when the preparation procedure is finished by completing forced movement of both the variator lens and the focus-compensation lens into corresponding focusable focal length areas in succession to the mounting of the wide-angle attachment lens.

When the preparation end flag fg remains "0," a determination is made of whether the current position of the variator lens 102 is within the focusable focal length area or not (step S303). If the current position of the variator lens 102 is within the focusable focal length area, the preparation end flag fg is raised to "1" (step S308), and the processing ends.

If the current position of the variator lens 102 is found to be outside the focusable focal length area in step S303, the zoom driving direction is set to the wide-angle end, and the driving speed of the variator lens 102 is set (step S304).

Next, the follow processing routine (step S305) is carried out. The follow processing routine is the process to follow the movement of the variator lens 102 according to the representative cam locus tables stored in the AF microcomputer 115 such as the ones shown in FIGS. 9(a) and 9(b). As shown in FIG. 9(a), one representative cam locus table lists data representing the relationship between the focal length (the position of the variator lens) and the position of the focus-compensation lens with no wide-angle attachment lens mounted. Listed in this table are representative values representing the above relationship. The other table in FIG. 9(b) lists data representing the relationship between the focal length (the position of the variator lens) and the position of the focus-compensation lens with the wide-angle attachment lens mounted. Listed in this table are representative values representing the above relationship. In each table, the leftmost column v lists the position of the variator lens 102, and the topmost row n lists object distance. The wide-angle end is represented by v=0, the telephoto end by v=s, the infinity object distance by n=0, and the minimum object distance by n=m.

As shown in FIG. 8, the representative values in the above tables are plotted as a curve f1 that represents the relationship between the focal length (the position of the variator lens 102) and the position of the focus-compensation lens with the wide-angle attachment lens mounted. Also plotted are curves f2 and f3 that represent the relationship between the focal length (the position of the variator lens 102) and the position of the focus-compensation lens with no wide-angle attachment lens mounted. The curve f1 is a locus of infinity object distance with the wide-angle attachment lens 121 mounted. The curve f2 is a locus of a 10 cm object distance with no wide-angle attachment lens 121 mounted. For example, h=10 cm, in a6 (in FIG. 8)=Ah6 (in FIG. 9(a)). The cam locus of the 10 cm object distance, in the vicinity of z7, goes beyond the electrical minimum end, namely, the software minimum end in the telephoto side, and thus stored representative locus of the 10 cm object distance takes a7, a8, . . . Shifted closer from the 10 cm cam locus to the minimum end is the curve or locus f1 that is the locus of infinity object distance with the wide-angle attachment lens mounted. The curve f3 is the locus of infinity object distance with no wide-angle attachment lens mounted.

The curve f2 is most closely positioned to the locus of infinity object distance with the wide-angle attachment lens mounted, and thus the curve f2 is used as a substitute for the locus of infinity object distance with the wide-angle attachment lens mounted.

It now assumed that the position of the variator lens 102 is beyond the focusable focal length area toward the telephoto side, namely, to the telephoto side of the limit 301 in FIG. 2(b), that the current position of the variator lens 102 is zx, and that the position of the focus-compensation lens 105 is px in the vicinity of infinity. When, under these conditions, the variator lens 102 is moved to the wide-angle end without having the focus-compensation lens follow the above cam locus, the focus-compensation lens 105 remains at px. As a result, an object in the vicinity of infinity is totally unfocused. The degree of unfocusing is minimized by allowing the focus-compensation lens to follow the 10 cm cam locus f2 with no wide-angle attachment lens mounted, which is most closely positioned to the locus of infinity object distance with the wide-angle attachment lens mounted, in the course of movement of the variator lens into within the focusable focal length area.

Assuming that the current position of the focus-compensation lens 105 is px, a corresponding position in driving the focus-compensation lens to the wide-angle side is a9, and thus a9−px is the driving distance of the focus-compensation lens 105. Let $\Delta F$ represent the position difference (=a9−px), $\Delta Z$ the position difference between two neighboring positions of zx to z9 of the variator lens 102, and Zsp the speed (zoom speed) of the variator lens 102. The focus following speed (the speed of the focus-compensation lens) Fsp is determined by Equation (4).

$$Fsp=\Delta F*Zsp/|\Delta Z| \quad (4)$$

a9 and z9 are corresponding values in the wide-angle side on the tables nearest to the current position.

Next, a focus driving direction and a focus driving speed are set (step S306). Specifically, the driving direction is set to the minimum side when $\Delta F$ is a positive value or to the infinity side when $\Delta F$ is a negative value. The focus following speed Fsp of the focus-compensation lens is also set. This completes the preparatory processing routine in mounting the wide-angle attachment lens.

When the wide-angle attachment lens is not mounted (step S301), the preparation end flag fg is set to "0" (step S309), and the processing ends.

Thus, the focus-compensation lens is set to follow the locus most closely positioned to the locus of infinity object distance with the wide-angle attachment lens mounted; the cam locus with the wide-angle attachment lens mounted is spaced as closely as 50 cm to the locus of infinity object distance as shown in FIG. 2(b); with the position of the focus-compensation lens 105 in the vicinity of the infinity locus, an object of an object distance of 1 m or more is focusable, and an unfocused state is thus prevented; and to achieve focusing on most of objects and still to avoid unfocused state, the focus-compensation lens is set to follow the locus most closely positioned to the locus of infinity object distance with the wide-angle attachment lens mounted. As a locus most closely positioned to the infinity locus with the wide-angle attachment lens mounted, a locus closer to the minimum end than the infinity locus to the minimum end or a locus closer to the infinity end may be perfectly acceptable.

When the wide-angle attachment lens is mounted, the variator lens 102 is moved into within the focusable focal length area, namely the variator lens 102 is shifted toward the wide-angle side (to the wide-angle side of the limit 301 in FIG. 2(b)). To reflect the intention of an operator who possibly wants to photograph in a wide-angle side setting with the wide-angle attachment lens, the variator lens 102 is desirably driven to the wide-angle end with a fixed position set to the wide-angle end.

When the wide-angle attachment lens is mounted at the telephoto end, the operator may want to photograph in the telephoto side setting, and thus the variator lens 102 is desirably driven to the limit 301 in FIG. 2(b).

Any position within a range from the limit 301 toward the wide-angle side is perfectly acceptable when the variator lens is driven into within the focusable focal length area with the wide-angle attachment lens mounted.

The driving operation of the focus-compensation lens 105 performed on the basis of the focus driving direction and the focus driving speed is discussed in detail.

The AF microcomputer 115 provides to the focus-compensation lens driver 119 a motor rotational frequency signal responsive to the focus driving speed and a motor rotational direction signal responsive to the zoom driving direction. In response to the motor rotational direction signal, the focus-compensation lens driver 119 sets up the exciting phase of the 4-phase motor for forward rotation or reverse rotation. Also, in response to the rotational frequency signal, the focus-compensation lens driver 119 varies a voltage (or a current) applied to the 4-phase motor exciter. The focus-compensation lens motor 120 is thus controlled in terms of its rotational direction and rotational frequency. Under such a controlling, the focus-compensation lens motor 120 rotates driving the focus-compensation lens 105.

The driving method of the focus-compensation lens 105 has been discussed. In this embodiment, the variator lens 102 is also driven by a stepping motor in a similar manner.

By following the locus most closely positioned to the locus of infinity object distance with the wide-angle attachment lens mounted, focusing operation can be performed on an object of an object distance of 1 m or more with the position of the focus-compensation lens 105 in the vicinity of the infinity locus. An unfocused state is thus prevented. As a locus most closely positioned to the infinity locus with the wide-angle attachment lens mounted, a locus closer to the minimum end than the infinity locus to the minimum end or a locus closer to the infinity end may be perfectly acceptable. The zooming operation is thus performed with an object kept in focus while the wide-angle attachment lens is mounted.

When the wide-angle attachment lens 121 is mounted, the variator lens 102 is moved into within the focusable focal length area, namely the variator lens 102 is shifted toward the wide-angle side (to the wide-angle side of the limit 301 in FIG. 2(b)). By setting the fixed position of the variator lens 102 to the wide-angle end, the intention of the operator who wants to photograph in the wide angle setting is reflected in the photographing operation.

The fixed position of the variator lens 102 is not limited to the wide-angle end, and any position within the focusable focal length area from the limit 301 toward the wide-angle end as shown in FIG. 2(b) is perfectly acceptable.

In this embodiment, the locus most closely positioned to the infinity locus with the wide-angle attachment lens mounted is followed. Depending on representative locus tables stored, however, a slight degree of unfocused state may take place on an object of a distance of 1 m or more. In such a case, by allowing the focus-compensation lens 105 to follow an approximate infinity locus with the wide-angle attachment lens mounted rather than the locus most closely positioned to the infinity locus with the wide-angle attachment lens mounted, such an unfocused state on the object of a distance of 1 m or more is further controlled.

Specifically, as apparent from FIG. 8, the difference between the infinity locus with the wide-angle attachment lens mounted and the 10 cm locus with no wide-angle attachment lens mounted is S at the wide-angle end and (S+$\alpha$) at z6. A rate of change between the two loci is thus $\alpha$. If $\alpha$ is small enough, the infinity locus with the wide-angle attachment lens mounted is a0+S, a1+S, a2+S, . . . , a6+S, a7+S, and a8+S. In step S305 in FIG. 7, the driving to the wide-angle side is performed with this locus followed. Specifically, in Equation (4), on the telephoto side of z7, $\Delta F = ak - pk$ (k=7, 8, 9, . . . ), and on the wide-angle side, $\Delta F = ak + S - pk$ (k=0, 1, 2, . . . , 6). The focus following speed Fsp is calculated from Equation (4). In step S306 in FIG. 7, the driving direction of the focus-compensation lens is set to the minimum side when $\Delta F$ is a positive value or to the infinity side when $\Delta F$ is a negative value. The focus following speed Fsp of the focus-compensation lens is also set. This completes the preparatory processing routine in mounting the wide-angle attachment lens.

In the driving direction and speed selecting routine (step S206), driving in excess of the electrical end to the minimum side is prohibited; thus, on the telephoto side of z7, in Equation (4), $\Delta F = ak + S - pk$ (k=0, 1, 2, . . . , 6, 7, . . . ).

As described above, if the infinity locus with the wide-angle attachment lens mounted has a slope similar to that of the representative locus with no wide-angle attachment lens mounted, which is a close approximation of the infinity locus, the representative value S, the difference between the two loci, may be added to the representative locus, which is consequently followed. In this method, an unfocused state on the object of a distance 1 m or more is avoided when the setting to the focusable focal length is performed with the wide-angle attachment lens mounted.

When a locus most closely positioned to the infinity locus with the wide-angle attachment lens mounted is on the minimum side of the infinity locus, the difference S between the two loci is subtracted from the infinity locus.

(Second Embodiment)

Referring to drawings, a second embodiment of the present invention is discussed.

Figure 10:
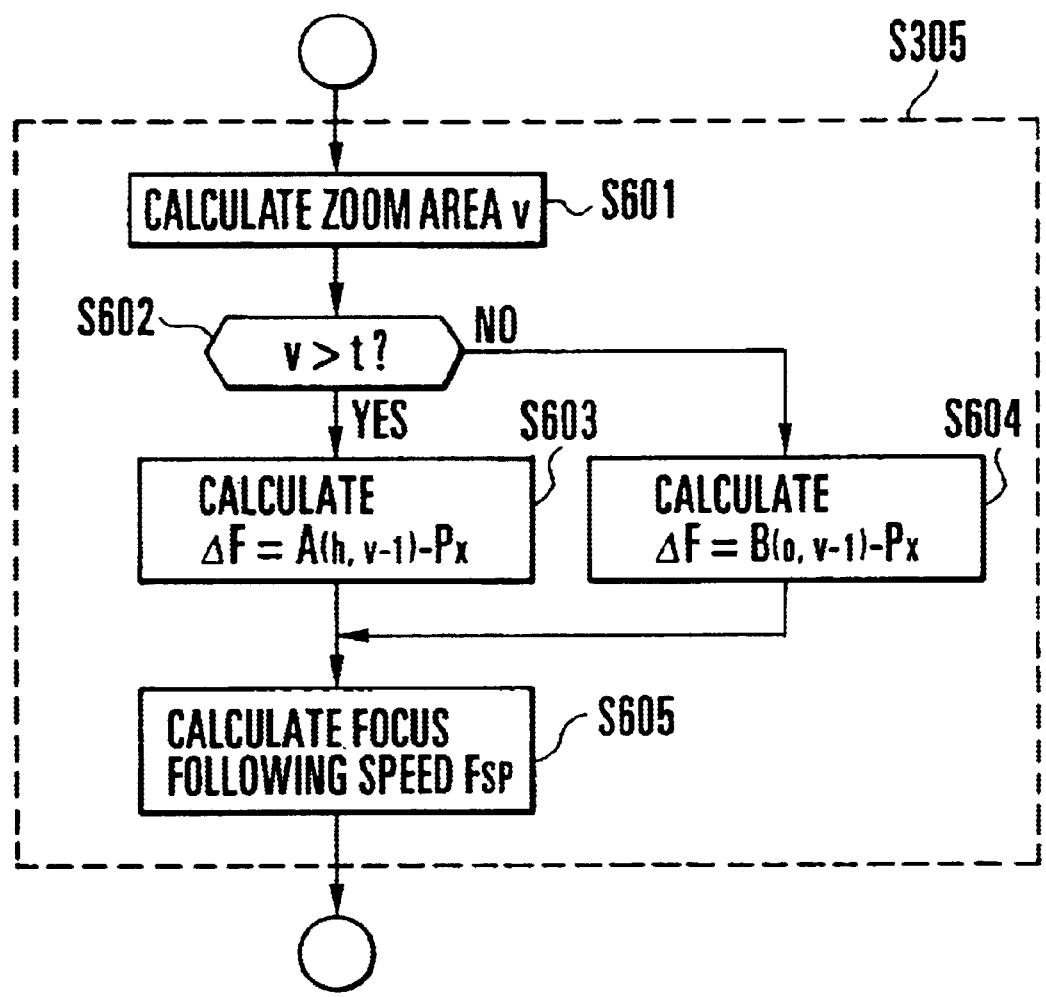
FIG. 10 is a flow diagram showing the follow processing routine in a forced zooming operation in the camera according to a second embodiment of the present invention.
Figure 11:
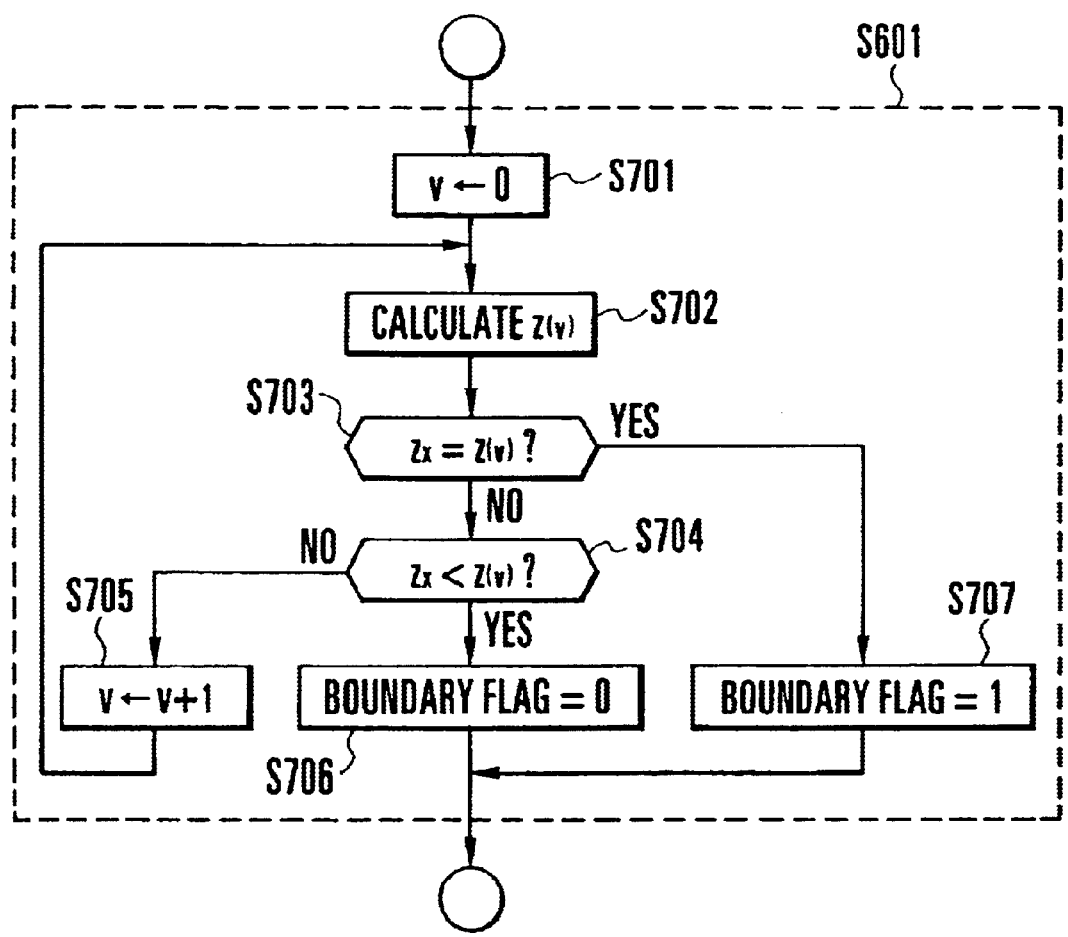
FIG. 11 is a flow diagram showing zoom area calculation steps of the follow processing routine.
Figure 12:
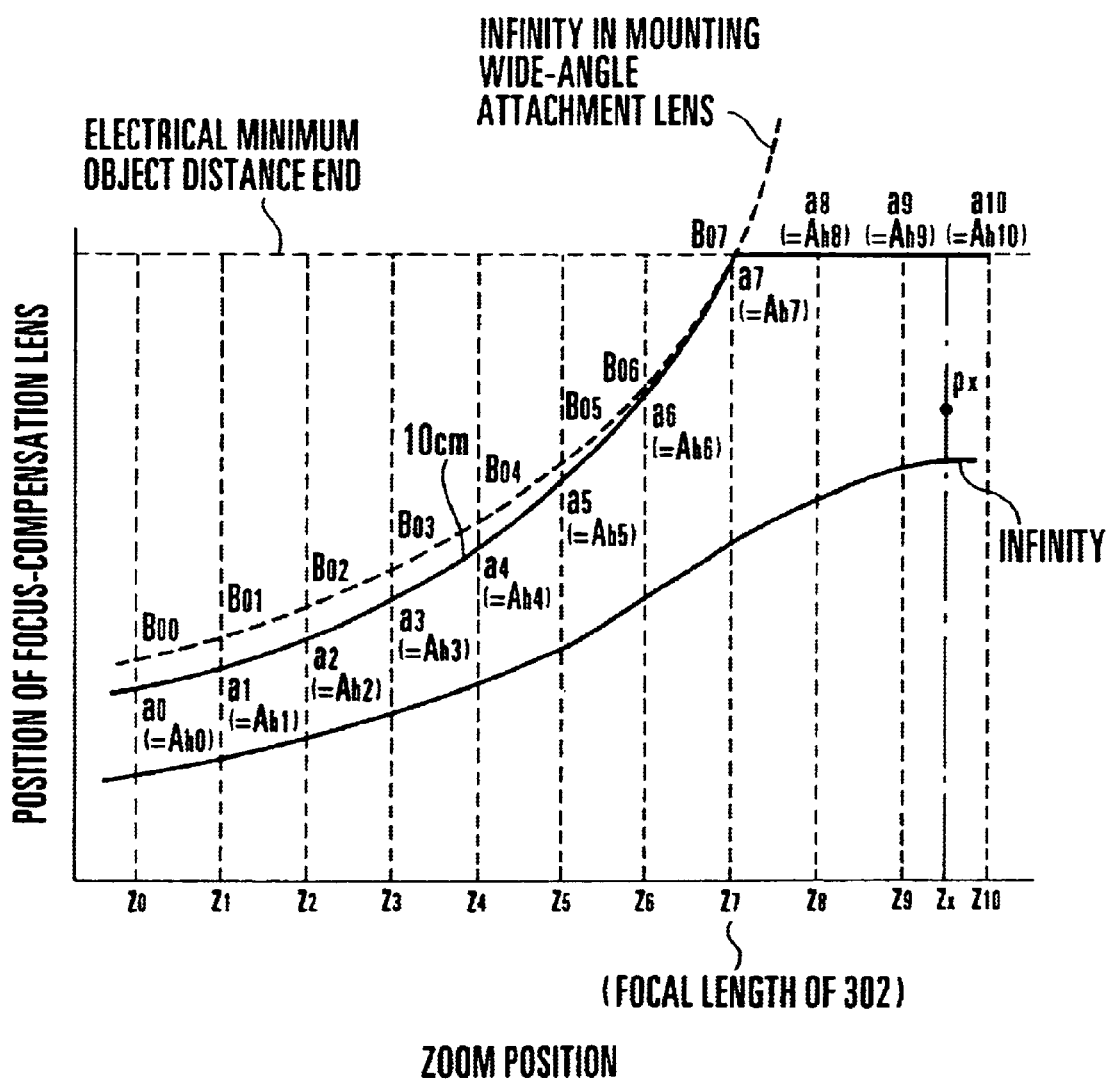
FIG. 12 shows the locus of the position of a focus-compensation lens with the wide-angle attachment lens mounted, wherein the slope of the locus differs from that of the locus obtained with no wide-angle attachment lens mounted.

FIG. 10 is a flow diagram showing the follow processing routine in a forced zooming operation in the camera according to the second embodiment of the present invention. FIGS. 11 and 12 are flow diagrams showing calculation steps for a zoom area V of the follow processing routine. FIG. 12 shows the locus of the position of a focus-compensation lens with the wide-angle attachment lens mounted, wherein the slope of the locus differs from that of the locus obtained with no wide-angle attachment lens mounted.

The construction of the camera in this embodiment remains unchanged from that of the camera in the first embodiment.

The focused cam loci are plotted as shown in FIG. 2(b) when object distance is varied with respect to focal length with the wide-angle attachment lens 121 mounted. When the slope of the locus with the wide-angle attachment lens mounted is substantially equal to that of the locus with no wide-angle attachment lens mounted, the method mentioned above in connection with the first embodiment suffers no unfocused state when the variator lens 102 is forced into the wide-angle side. If the slopes of both loci with and without the wide-angle attachment lens are substantially different, however, the above-mentioned method suffers an unfocused state, resulting degraded image quality.

Discussed below is a forced movement method of the variator lens 102 that suffers no unfocused state with the wide-angle attachment lens mounted even when the slope of the locus with the wide-angle attachment lens mounted is substantially different from that of the locus with no wide-angle attachment lens mounted.

Referring to FIG. 12, the locus with the wide-angle attachment lens mounted having a slope different from that of the locus with no wide-angle attachment lens mounted is plotted by a dotted line. As apparent from FIG. 12, the focused position of the locus of 10 cm object distance and the focused position of the locus with the wide-angle attachment lens mounted agree with each other at the position z7 of the variator lens. As running toward the wide-angle side, however, both loci diverge.

When the loci diverge as shown, the locus with the wide-angle attachment lens mounted as shown in FIG. 2(b) is stored as tabled data in the AF microcomputer 115 and is used to avoid an unfocused state.

Locus data in FIG. 2(b) may be related to tabled data in FIG. 9(b). Data in a single column in the table may be used to plot a single locus. In FIG. 9(b), the row n represents object distance, and the column v represents the position of the variator lens (focal length). Each data B (n,v) is a variable representing a focused position (the position of the focus-compensation lens). The infinity object distance is represented by n=0, the minimum object distance by n=m, and the wide-angle end by v=0. The focal length designated by 302 in FIG. 2(b) corresponds to v=t. When the wide-angle attachment lens is mounted, focusing is possible on the infinity objects only at the position 302 in FIG. 2(b). The position 301 of the variator lens where focusing is possible over all object distance corresponds to v<t.

When the variator lens 102 is forced into within the focusable focal length area with the wide-angle attachment lens mounted, the cam locus of a particular object distance (here infinity object distance) with the wide-angle attachment lens mounted is followed. By storing the data belonging to a single column n=k (here n=0) in the tabled data in FIG. 9(b) with the wide-angle attachment lens mounted, the variator lens 102 is forced into within the focusable focal length while keeping a focused state.

The forced movement method of the variator lens 102 with the wide-angle attachment lens mounted is now discussed.

In the forced movement method of the variator lens 102 with the wide-angle attachment lens mounted, this embodiment is different from the first embodiment only in the follow processing routine (step S305 in FIG. 7). Both embodiments are identical in the remaining routines. FIG. 10 shows a processing difference incorporated into step S305 in FIG. 7.

When the follow processing routine is executed, zoom area v is calculated to locate the zoom area v within which the position Zx of the variator lens 102 falls (step S601). FIG. 11 shows the detail of step S601.

As shown in FIG. 11, in the zoom area calculation, the zoom area variable v is initialized by resetting it to "0". The zoom positions Z(v) at boundaries between zoom areas are calculated (step S702). The zoom positions Z(v) correspond to z0, z1, z2, . . . in FIG. 12.

$$Z(v)=(\text{Telephoto end zoom position}-\text{Wide-angle end zoom position})*v/s+\text{Wide-angle end zoom position} \quad (5)$$

Here, the division operation by the value s is to equally divide the overall range of travel of the variator lens by the data area number s in FIG. 9(a).

In succession to the calculation of zoom positions Z(v), a determination is made of whether the position Zx of the variator lens 102 equals the position Z(v) (step S703). When the position Zx of the variator lens 102 equals the zoom position Z(v), a boundary flag is raised to "1" based on the determination that the position Zx of the variator lens 102 lies on the boundary of the area v (step S707). This completes step S601.

When the position Zx of the variator lens 102 is not equal to the zoom position Z(v) in step S703, a determination is made of whether-the position Zx of the variator lens 102 is smaller than the position Z(v) (step S704). When the position Zx of the variator lens 102 is smaller than Z(v), the boundary flag is set to "0" (step S706) based on the determination that the position Zx of the variator lens 102 is somewhere between Z(v-1) and Z(v). This completes step S601.

When step S704 reveals that the position Zx of the variator lens 102 is not smaller than the zoom position Z(v), the zoom area v is incremented (step S705), and the same processing starts over with step S702. The above processing determines if the current position Zx of the variator lens 102 lies in the zoom area of v=k in the table shown in FIG. 9(b), and further if the current position Zx of the variator lens 102 lies on the boundary of the zoom area of v=k. In the table in FIG. 9(b), variable v satisfies the relationship, 0≦v≦t. In this embodiment, the position Zx of the variator lens 102 lies in the zoom area of v=10.

In succession to the calculation of the zoom area v, a determination is made of whether the calculated zoom area v is greater than the area t (step S602). This routine determines whether or not the current position of the variator lens 102 lies to the telephoto side of the position 302 in FIG. 2(b). The position 302 corresponds to z7 in FIG. 12.

When step S602 reveals that the current position of the variator lens lies in the telephoto side of 302, a target position to be followed is-set to data A(h,v-1) in the zoom area, v-1, which is shifted to the wide-angle side by one zoom area from the current position of the variator lens, and a difference quantity ΔF between A(h,v-1) and the current position Px of the focus-compensation lens is then calculated (step S603). The following equation (6) determines the difference ΔF.

$$\Delta F = A(h, v-1) - Px \quad (6)$$

where A(h,v-1) represents data of the zoom area, (v-1), which is closer to the wide-angle side by one zoom area from the current position of the variator lens 102 (n=h corresponds to the locus data of 10 cm object distance). A(h,v-1) is used to as the target position to be followed. Px represents the current position of the focus-compensation lens.

When step S602 reveals that the calculated zoom area v is not greater than the area t, the difference ΔF is calculated (step S604). The difference ΔF is calculated by the following equation (7).

$$\Delta F = B(0, v-1) - Px \quad (7)$$

where B(0,v-1) represents locus data of the infinity object distance with the wide-angle attachment lens mounted. B(0,v-1) is used as the target position to be followed.

In succession to the calculation of the difference, ΔF, the focus following speed, Fsp, is calculated by Equation (4) (step S605). In this calculation, the difference, ΔZ is (Zv-1-Zx).

The above follow processing routine is followed by the same processing as step S306 in FIG. 7.

As mentioned above, in this embodiment, forced zoom driving is performed to within the focusable focal length area with the wide-angle attachment lens mounted while an object is kept in focus even if the presence or absence of the wide-angle attachment lens makes a substantial difference in the slope of the locus of the focused position of the focus compensation lens 105 relative to the variator lens 102 with respect to object distance.

(Third Embodiment)

Referring to drawings, a third embodiment of the present invention is discussed.

The construction of the camera in this embodiment remains unchanged from that of the camera in the first embodiment.

In the first and second embodiments, the variator lens 102 is forced into within the focusable focal length area by following the cam locus of the infinity object distance with the wide-angle attachment lens mounted or the cam locus of the approximate infinity object distance. When an object, which was photographed immediately before the mounting of the wide-angle attachment lens, has a minimum distance (for example, an object having a distance of 50 cm or smaller on the loci shown in FIG. 2(b)), a forced following along the infinity locus creates an unfocused state.

Figure 16:
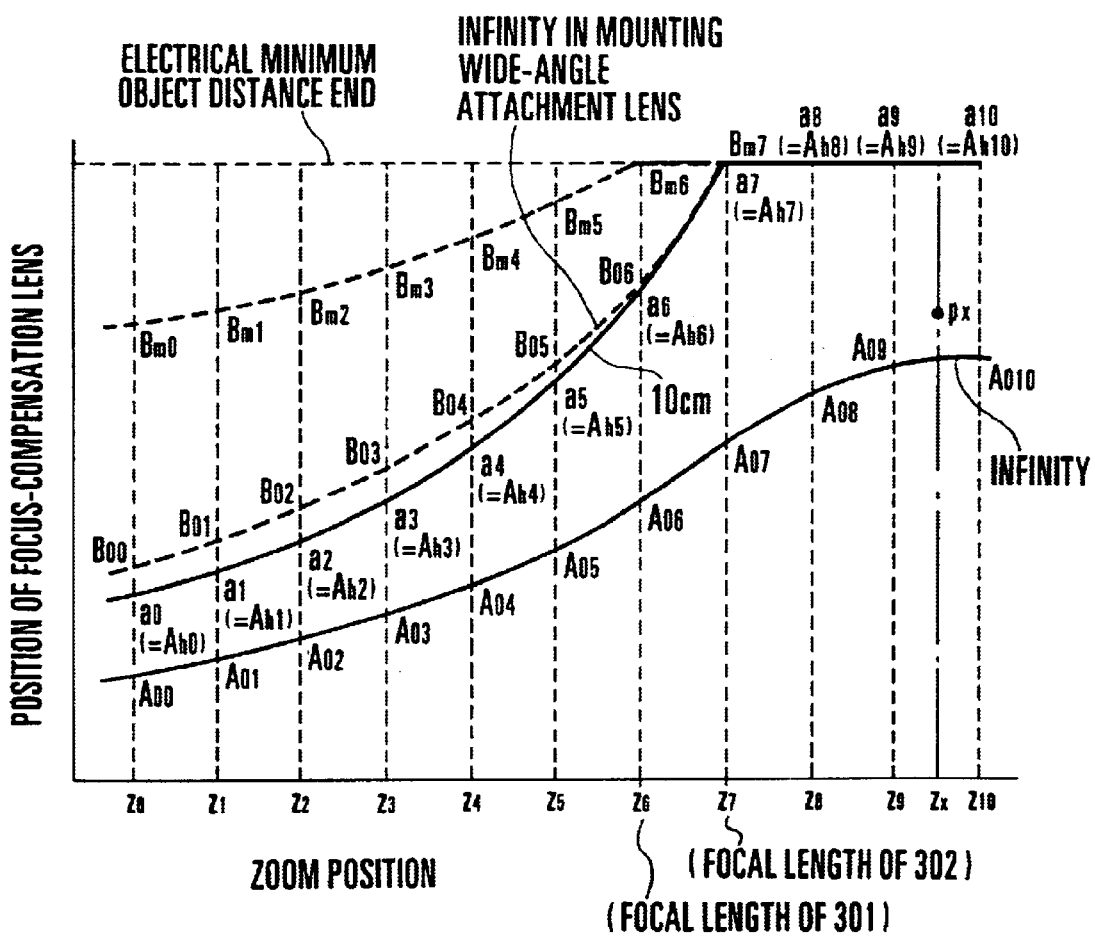
FIG. 16 shows the locus of the position of the focus-compensation lens with the wide-angle attachment lens mounted, wherein the slope of the locus differs from that of the locus obtained with no wide-angle attachment lens mounted.

The slope of a locus with the wide-angle attachment lens 121 mounted may be different with object distance (such as loci as shown in FIG. 16). If the locus of the infinity object distance is followed in such a case with the wide-angle attachment lens mounted, the focus-compensation lens 105 may shift off its real focused position depending on the object photographed. Thus, an unfocused state results, deteriorating image quality.

The two above-mentioned cases are resolved to prevent unfocused state in the following manner: The cam locus information with the wide-angle attachment lens mounted is stored for each object distance; an object distance which was used for photographing is determined from the position of the variator lens 102 and the position of the focus-compensation lens 105 with the wide-angle attachment lens mounted; by selecting and following the locus that matches the object distance in focusing operation, the variator lens 102 is forced into within the focusable focal length area.

In this method, locus data representing a plurality of object distances with the wide-angle attachment lens mounted shown in FIG. 9(b) are stored in-the AF microcomputer 115. The locus that matches the determined object distance in focusing operation is obtained by interpolating stored locus data. Specifically, a locus to be followed, between the cam locus of the infinity object distance and the cam locus of the minimum object distance, with the wide-angle attachment lens mounted in FIG. 16, is determined by applying interpolation to a plurality of stored data.

Figure 13:
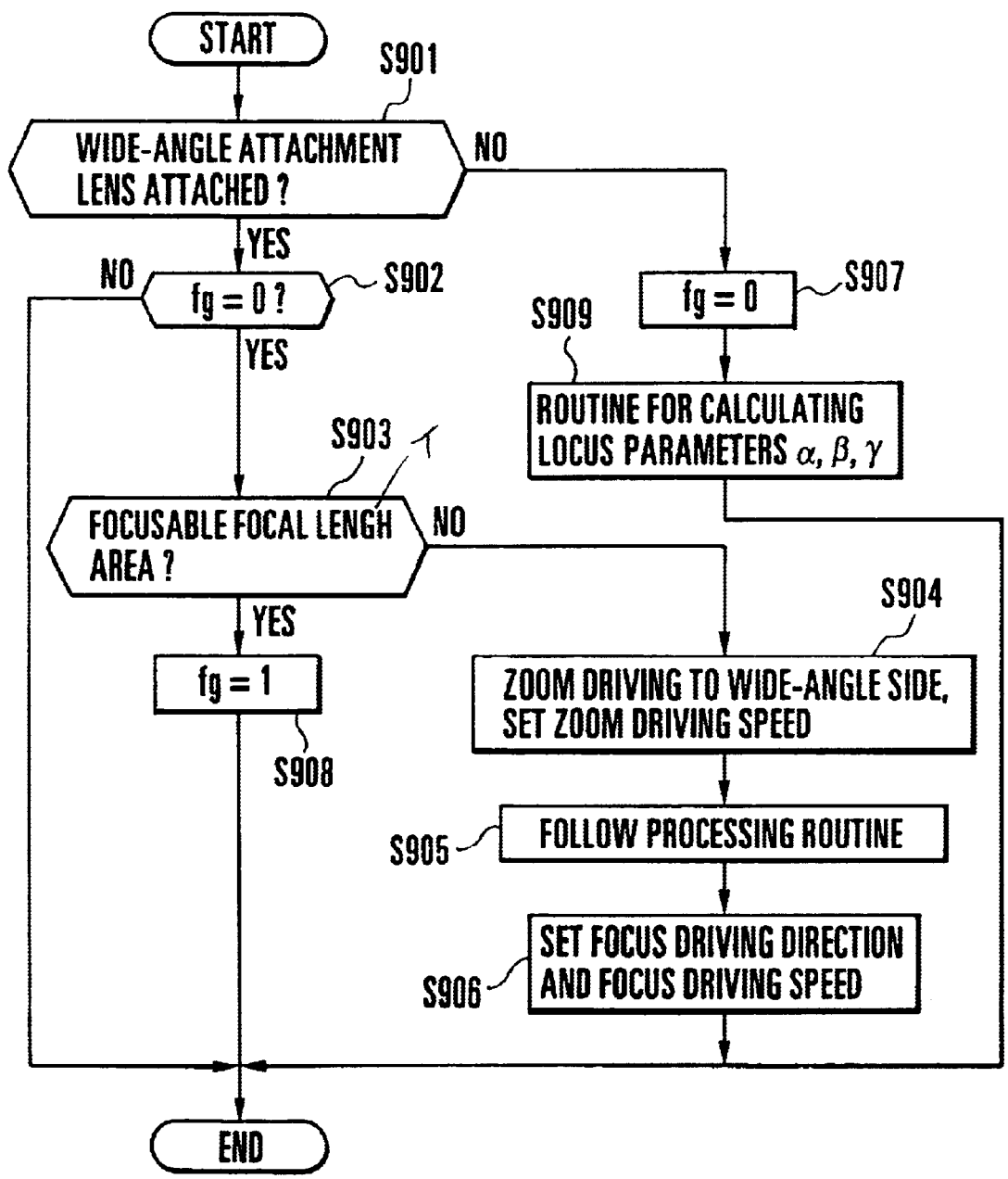
FIG. 13 is a flow diagram showing the preparatory processing routine in the camera according to a third embodiment of the present invention with the wide-angle attachment lens mounted.
Figure 14:
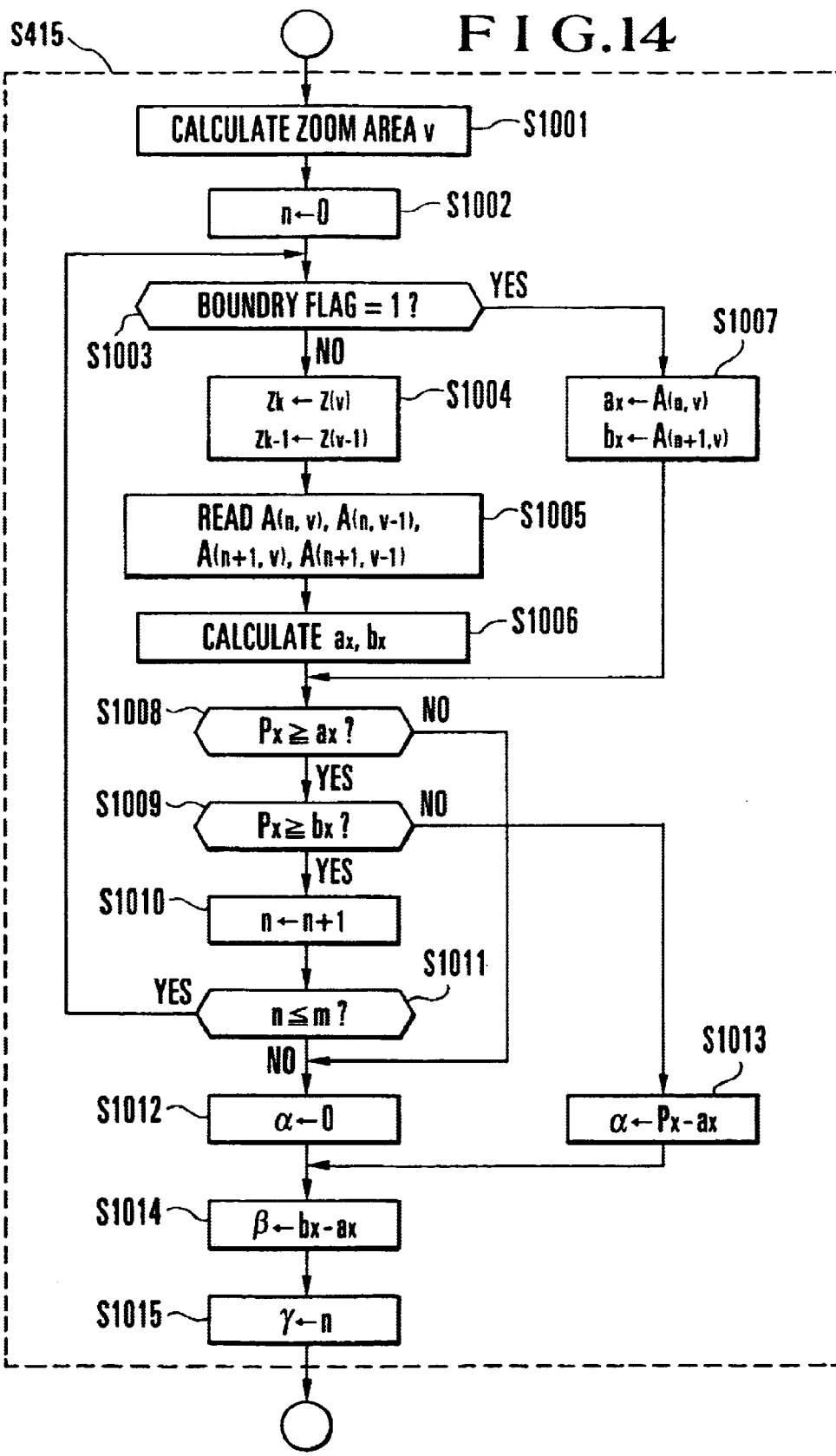
FIG. 14 is a flow diagram showing the calculation routine for locus parameters, α, β, and γ in FIG. 13.
Figure 15:
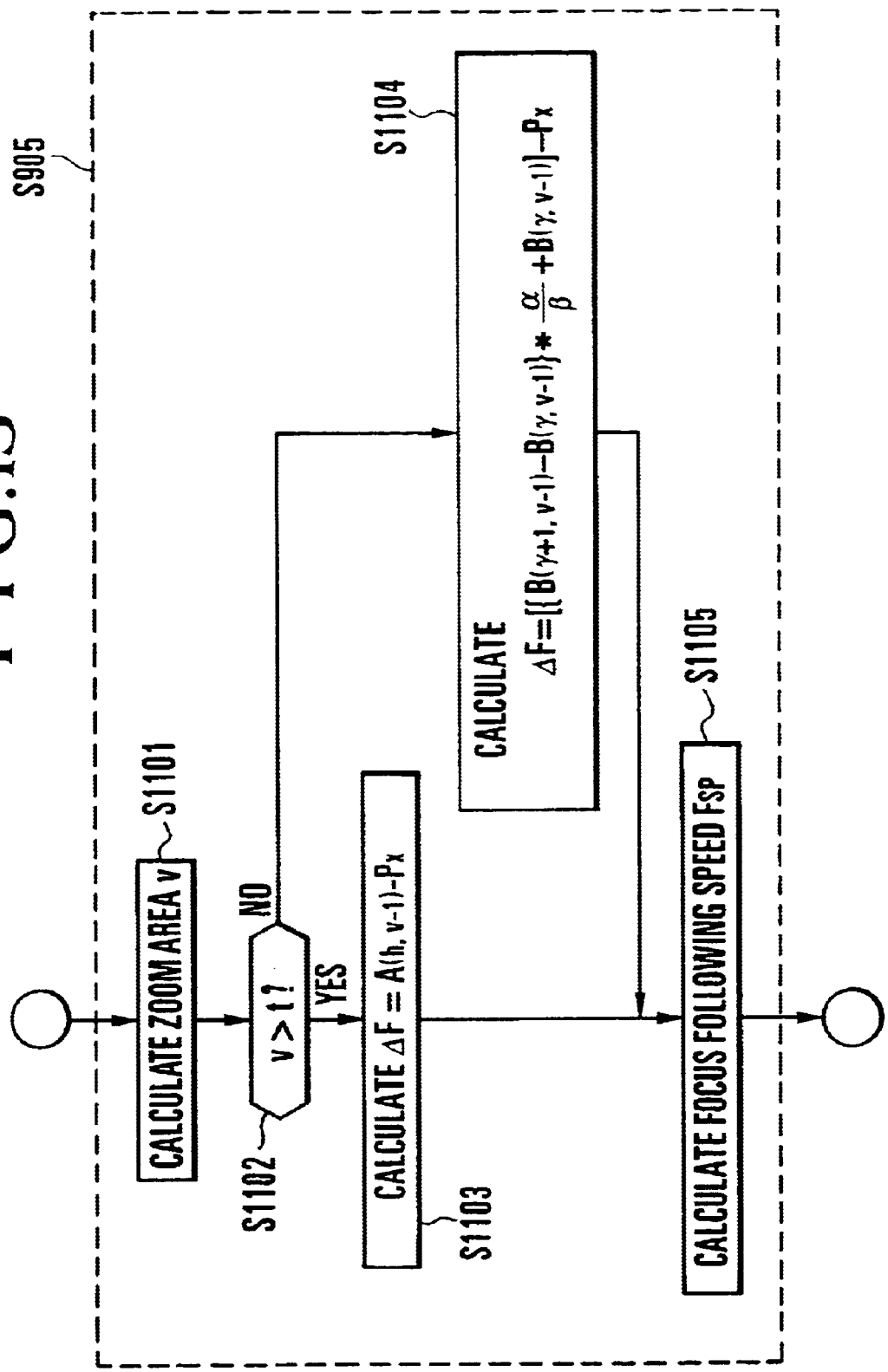
FIG. 15 is a flow diagram showing the follow processing routine of FIG. 13.

Referring to drawings, the preparatory processing routine in the camera in this embodiment with the wide-angle attachment lens mounted is discussed. FIG. 13 is the flow diagram showing the preparatory processing routine in the camera according to the third embodiment of the present invention with the wide-angle attachment lens mounted. FIG. 14 is the flow diagram showing the calculation routine for cam locus parameters, α, β, and γ in step S909 in FIG. 13. FIG. 15 is the flow diagram showing the follow processing routine of FIG. 13. FIG. 16 shows the locus of the position of the focus-compensation lens with the wide-angle attachment lens mounted, wherein the slope of the locus differs from that of the locus obtained with no wide-angle attachment lens mounted.

In the flow diagram in FIG. 13, when the preparatory processing routine with the wide-angle attachment lens mounted is executed (step S203 in FIG. 6), first, a determination is made of whether the wide-angle attachment lens 121 is mounted (step S901). When the wide-angle attachment lens 121 is mounted, a determination is made of whether the preparation end flag fg is raised (step S902). When the preparation end flag fg is found to be "1," the processing ends because the preparation is complete.

When the preparation end flag is "0," a determination is made of whether the variator lens 102 is within the focusable focal length area (step S903). If the current position of the variator lens 102 is within the focusable focal length area, the preparation end flag fg is set to "1" (step S908), and the processing ends.

When the current position of the variator lens 102 is not within the focusable focal length area, the zoom driving direction is set to the wide-angle side and the zoom driving speed is set (step S904).

Then, the follow processing routine is executed (step S905). The follow processing routine is discussed further in detail later.

Next, a focus driving direction and a focus driving speed are set (step S906). Specifically, the driving direction is set to the minimum side when ΔF is a positive value or to the infinity side when ΔF is a negative value. The focus following speed Fsp of the focus-compensation lens is also set.

When the wide-angle attachment lens is not mounted (step S901), the preparation end flag fg is set to "0" (step S907), and calculation routine for cam locus parameters, α, β, and γ is executed (step S909). The calculation routine for cam locus parameters, α, β, and γ is further discussed in detail later.

The processing ends when the calculation routine for locus parameters α, β, and γ is completed.

Referring to the flow diagram in FIG. 14, the calculation routine for locus parameters α, β, and γ is discussed in detail.

In the calculation routine for locus parameters α, β, and γ in FIG. 14, the zoom area calculation is performed to identify the zoom area v in which the variator lens 102 currently lies (step S1001). The content of this processing remains substantially unchanged from that illustrated in FIG. 11.

In succession to the zoom area calculation in step S1001, object distance n is initialized to "0" (step S1002).

After the initialization of the object-distance n, a determination is made of whether the current position of the variator lens 102 lies on the boundary of a zoom area, referring to the boundary flag (step S1003). When the boundary flag is set "0," it is recognized that the current position of the variator lens 102 does not lie on the boundary of the zoom area. When the boundary flag is set to "1," it is recognized that the current position of the variator lens 102 lies on the boundary of the zoom area.

When the boundary flag is "0," Zk=Z(v), Zk−1=Z(v−1). For example, when the zoom position is Zx in FIG. 16, Zk=Z10, Zk−1=Z9.

Then, four tabled data, A(n,v−1), A(n,v), A(n+1,v−1), and A(n+1,v)-are read (step S1005). From Equations (2) and (3), ax and bx are calculated (step S1006).

When the boundary flag is "1" in step S1003, the object distance n, focused position of the focus-compensation lens 105 A(n,v), A(n+1,v) relative to the variator lens 102 are read, and A(n,v) and A(n+1,v) are stored as ax and bx (step S1007).

In succession to the calculation of ax and bx, a determination is made of whether the current position Px of the focus-compensation lens 105 is greater than ax or not (step S1008). When the Px is greater than ax, a determination is made of whether Px is greater than bx (step S1009).

When step S1009 reveals that Px is greater than bx, namely that Px is positioned closer to the minimum side, the object distance n is incremented (step S1010). A determination is made of whether the object distance n is equal to or smaller than a minimum object distance m (step S1011). When the object distance n is equal to or smaller than the minimum object distance m, the processing starts over with step S1003. When the object distance n is not equal to nor smaller than the minimum object distance m, Px is at the super-minimum position, and locus parameter α is stored as "0" (step S1012).

Locus parameter β is given as a difference, bx−ax, and then stored (step S1014). The storing of locus parameter β is followed by storing the object distance n as locus parameter γ (step S1015).

When step S1008 reveals that Px is not greater than ax, Px is at the super-infinity position. "0" is stored as locus parameter α, the difference, bx−ax, is stored as locus parameter β, and the object distance n is stored as locus parameter γ (steps S1012, S1014, and S1015).

When Px is not greater than bx (step S1009), Px must lie between the object distances n and n+1. The difference, px−ax, is stored as locus parameter α (step S1013). The difference, bx−ax, is stored as locus parameter β, and the object distance n as locus parameter γ (steps S1014, and S1015).

Locus parameters, α, β, and γ representing where the position of the variator lens 102 and the position of the focus-compensation lens 105 are on the locus are sequentially updated and stored and then used as the object distance information immediately before the mounting of the wide-angle attachment lens 121.

Referring to FIG. 15, the follow processing routine in this embodiment is discussed.

In the follow processing routine in FIG. 15, the zoom area calculation, zoom area v is calculated to locate the zoom area v within which the position Zx of the variator lens 102 falls (step S1101).

In succession to the calculation of zoom area, a determination is made of whether the calculated zoom area v is greater than the area t (step S1102). This routine determines whether or not the current position of the variator lens 102 lies in the telephoto side of the position 302 in FIG. 2(*b*).

When the calculated zoom area v is greater than the area t, the current position of the variator lens 102 is to the telephoto side of the position 302 in FIG. 2(*b*) (corresponding to Z7 in FIG. 16). The difference ΔF is determined from the above Equation (6) (step S1103). Here, A(h,v−1) represents data of the zoom area, (v−1), which is closer to the wide-angle side by one zoom area from the current position of the variator lens 102 (n=h corresponds to the locus data of 10 cm object distance). A(h,v−1) is used to as the target position to be followed. Px represents the current position of the focus-compensation lens 105.

When the calculated zoom area v is not greater than the area t, the difference ΔF is calculated (step S1104). The difference, ΔF, is determined from Equation (8).

$$\Delta F=[\{B(\gamma+1,v-1)-B(\gamma,v-1)\}*\alpha/\beta+B(\gamma,v-1)]-Px \qquad (8)$$

where the calculated target position to be followed is represented by $[\{B(\gamma+1,v-1)-B(\gamma,v-1)\}*\alpha/\beta+B(\gamma,v-1)]$. In the course of determining the difference, ΔF, the calculated target position to be followed is obtained by setting the interior division to a fixed value by substituting $\alpha/\beta$ for $\{|p(n)-a(n)|/|b(n)-a(n)|\}$ in Equation (1).

In succession to the determination of the difference, ΔF, the focus following speed Fsp is calculated from Equation (4) (step S1105). The difference in zoom position ΔZ is Zv−1−Zx.

The same processing as in step S306 in FIG. 7 is executed when the follow processing routine is complete.

In this embodiment, when the wide-angle attachment lens is mounted, the forced zoom operation into the focusable focal length area-is performed without creating unfocused state regardless of the object distance that was used immediately before the mounting of the wide-angle attachment lens. Also, the forced zoom operation is performed while keeping an object in focus even if the slope of the locus of object distance greatly varies with object distance as a result of mounting the wide-angle attachment lens 121.

In one aspect of the camera according to the present invention, the variator lens group is forced to move to a predetermined position within a second focal length area when the conversion lens group is mounted. The focused position of the focus-compensation lens group relative to the variator lens group, varying with the forced shifting of the variator lens group, is calculated. The focus-compensation lens group is then so shifted so that it follows the calculated focused position. The forced zoom operation is thus performed while keeping an object in focus with the conversion lens group such as the wide-angle attachment lens mounted. Furthermore, an improved automatic focus adjustment response results.

In another aspect of the present invention, focused position data of the focus-compensation lens group relative to the variator lens group, predetermined with respect to object distances, comprise first focused position data. The variator lens group is forced to move to a predetermined position within a second focal length area when the conversion lens group is mounted onto the zoom lens unit. In the course of zoom operation, the first focused position data are used to determine the focused position of the focus-compensation lens group; thus, a relatively small memory capacity is sufficient enough to store data for the forced zoom operation.

In yet another aspect of the present invention, focused position data of the focus-compensation lens group relative to the variator lens group, predetermined with respect to object distances, comprise first focused position data. The variator lens group is forced to move to a predetermined position within a second focal length area when the conversion lens group is mounted onto the zoom lens unit. Second focused position data that are derived by adding a predetermined value to the first focused position data are used to determine the focused position of the focus-compensation lens group. The focused position data with the conversion lens group mounted are thus refined sufficiently enough to widen the focusable focal length area.

In yet another aspect of the present invention, focused position data of the focus-compensation lens group relative to the variator lens group, predetermined with respect to object distances, comprise first focused position data and second focused position data. When the variator lens group is forced to move to a predetermined position within a second focal length area when the conversion lens group is mounted onto the zoom lens unit, either the first focused position data or the second focused position data are selected. The selected focused position data are used to determine the focused position of the focus-compensation lens group. The focused position data with the conversion lens group mounted are thus refined sufficiently enough to widen the focusable focal length area.

In yet another aspect of the present invention, the variator lens group is forced to move to a predetermined position within a second focal length area when the conversion lens group is mounted. The focused position with a particular object distance immediately before the mounting of the conversion lens group is determined. The focus-compensation lens group is moved to the focused position with the object distance. The forced zoom operation is thus performed while keeping an object in focus with no influence by the object distance used immediately before the mounting of the conversion lens group.

(Fourth Embodiment)

A fourth embodiment of the present invention is now discussed.

In this embodiment, the reference position of the variator lens is changed in accordance with the focusable focal length area that varies in response to the mounting of the wide-angle attachment lens; and when power is switched on with the wide-angle attachment lens mounted, image output is initiated after completion of the initialization of the lenses. Therefore, the output of a degraded quality image is thus prevented.

In the zoom lens according to the present invention, the position of the focus-compensation lens during power variation is determined by the above-mentioned Equation (1). When the focus-compensation lens is at the position p0, the interior division ratio by p0 that divides the line segment b0–a0 is determined. Interpolating the line segment b1–a1 by the interior division ratio gives a point p1. The speed of the focus-compensation lens 105 to keep focused state can be determined by the positional difference between p1 and p0 and the time the variator lens 102 requires to travel from z0 to z1. The curve representing the relationship between the focal length (the position of the variator lens 102) of the zoom lens unit 100 and the position of the focus-compensation lens 105 with no wide-angle attachment lens 121 mounted is followed by allowing the focus-compensation lens 105 to travel at this determined speed. This has been already described.

Provided to perform the follow operation are a position counter to detect an instantaneous position of the variator lens 102 and a position counter to detect an instantaneous position of the focus-compensation lens 105. If the counts of the position counters suffer from a deviation or an error, retrieval of the locus data stored in the AF microcomputer also suffers from an error, wherein the locus data are a combination of coordinates consisting of the position of the variator lens 102 and the position of the focus-compensation lens 105. Such an incorrect data retrieval leads to an incorrect follow operation for keeping the focused state. A power variation operation thus creates an unfocused state.

As one method to prevent the unfocused state attributed to the error in each position counter, each counter is reset to its reference count. In this method, prior to the transition to normal operation phase from the power-on phase in the camera, both the variator lens 102 and the focus-compensation lens 105 are moved to their respective predetermined positions to reset respective position counters there. A photodiode is used to detect the presence of each lens that has arrived at its predetermined position. Each photodiode is disposed at its corresponding predetermined position. The lens position that causes a change in the output of each photodiode is set as the reset position in each position counter, and the corresponding count in each counter is set as a value determined by balance adjustment in the optical system. During movement of each lens for counter resetting, a photographed image suffers from a large degree of unfocused state, and the image is thus not output. The image is output after the completion of this counter reset operation.

Also proposed is another method which prevents any change in the field of view and the like as a result of lens movement for counter resetting operation, by continuously disabling output of the photographed image even after the completion of counter resetting and shifting each lens back to its initial position prior to power-on.

FIGS. 2(a) and 2(b) illustrate the relationship between the focal length (the position of the variator lens 102) of the zoom lens unit 100 and the position of the focus-compensation lens 105 with the wide-angle attachment lens 121 mounted, as already described.

When the focal length of the zoom lens unit 100 is set to a predetermined value, the focused position of the focus-compensation lens 105 varies with the object distance as shown in FIG. 2(b). With the object distance kept constant, the focused position of the focus-compensation lens 105 varies with focal length, namely with the position of the variator lens 102. As can be seen from FIG. 2(b), however, the curve representing the relationship, in terms of object distance as parameter, between the focal length and the position of the focus-compensation lens 105 is different from the curve representing the relationship, in terms of object distance as parameter, between the focal length and the position of the focus-compensation lens 105 with no wide-angle attachment lens 121 mounted. In FIG. 2(b), if the focal length exceeds a limit 301, the curves representing the relationship, in terms of object distance as parameters, between the focal length and the position of the focus-compensation lens 105 diverge out of the focusable focal length area. If the focal length is kept to within the limit 301, namely, the focal length is set to any value closer to the wide-angle side, focus adjustment by means of the focus-compensation lens 105 remains workable. If the focal length exceeds the limit 301, however, namely, the focal length is set to any value closer to the telephoto side, focus adjustment by means of the focus-compensation lens 105 is impossible. To cope with this problem, the variator lens 102 is moved until the focal length is set to be closer to the wide-angle side, and is fixed there. Therefore, the variator lens 102 is fixed at such a predetermined position, and zooming operation is disabled when the wide-angle attachment lens 121 is mounted.

When the wide-angle attachment lens 121 is mounted with the zoom lens unit 100 positioned on the telephoto side, the variator lens 102 is forced to move closer to the wide-angle side. In the course of this movement, an unfocused state takes place.

The variator lens 102 is forced to move closer to the wide-angle side when power is switched on with the wide-angle attachment lens 121 mounted onto the zoom lens unit 100. Thus, an unfocused image output and varied field of view result during the forced movement of the variator lens 102. If the mounting of the wide-angle attachment lens 121 goes unnoticed, these may be confusing to an operator.

The object of this embodiment is to provide a camera, which avoids an operator's confusion attributed to the fact that the mounting of a conversion lens group such as a wide-angle attachment lens goes unnoticed, and which offers an improved image quality and improved automatic focus adjustment performance.

To achieve the above object, this embodiment comprises a zoom lens unit having a variator lens group and a focus-compensation lens group which compensates for in a focused position a variation arising from power variation operation of the variator lens group, a conversion lens group mounted onto the zoom lens unit in a detachable manner, for shifting a focusable focal length area of the zoom lens unit to a second focal length area from a first focal length area while the conversion lens group is mounted, position detecting means for detecting a position of the focus-compensation lens group on the basis of a predetermined reference position, and reference position shifting means for shifting the predetermined reference position to a reference position corresponding to the second focal length-area when the conversion lens group is mounted on the zoom lens unit.

Figure 17:
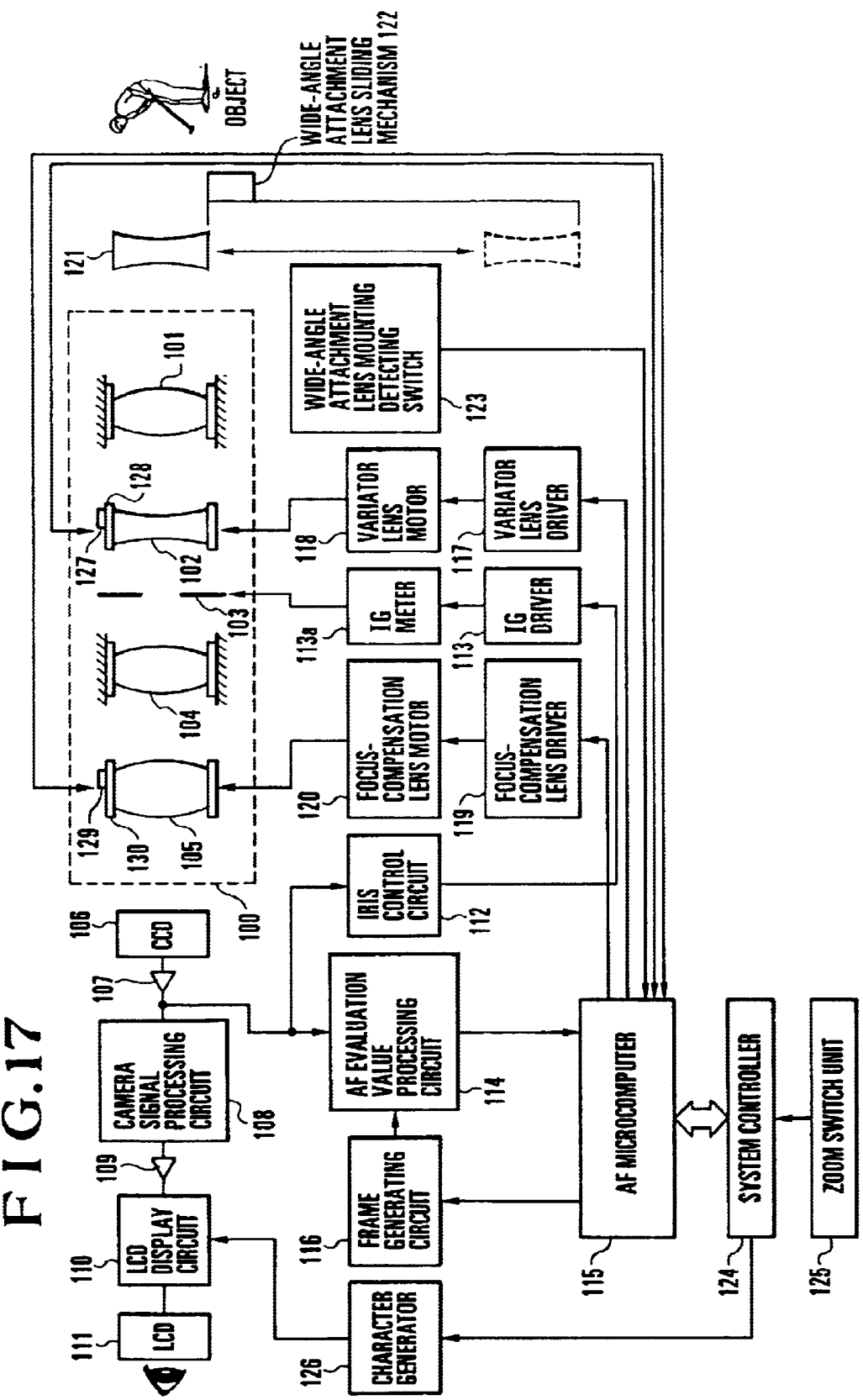
FIG. 17 is a block diagram showing the camera according to a fourth embodiment of the present invention.

The fourth embodiment of the present invention is now discussed. FIG. 17 is the block diagram showing the construction of the fourth embodiment. In FIG. 17, those components equivalent to those described with reference to FIG. 5 are designated with the same reference numerals, and their description is omitted.

The variator lens 102 contains a photosensor 128 for detecting whether the variator lens 102 is situated at its reference position or not. The optical path of the photosensor 128 is opened or closed by a position detecting switch 127. The position detecting switch 127 is attached onto the lens casing. The position detecting switch 127 is mounted with its boundary, between block and transmission of light, coming to the middle of the range of travel of the variator lens 102. The movement of the photosensor 128 relative to the position detecting switch 127 allows the output light to be blocked or transmitted. When the state in which the output light of the photosensor 128 is transmitted is changed to the state in which the output light of the photosensor 128 is blocked, the signal responsive to the output light transitions from H (high) to L (low) level. The point of this signal transition is identified as the reference position. Thus, a determination is made of whether the variator lens 102 is positioned at the reference position or not.

The focus-compensation lens 105 contains a photosensor 130 for detecting whether the focus-compensation lens 105 is situated at its reference position or not. The optical path of the photosensor 130 is opened or closed by a position detecting switch 129. The position detectingr switch 129 is attached onto the lens casing. The position detecting switch 129 is mounted with its boundary, between block and transmission of light, coming to the middle of the range of travel of the focus-compensation lens 105. The movement of the photosensor 130 relative to the position detecting switch 129 allows the output light to be blocked or transmitted. When the state in which the output light of the photosensor 130 is transmitted is changed to the state in which the output light of the photosensor 130 is blocked, the signal responsive to the output light transitions from H to L level. The point of this signal transition is identified as the reference position. Thus, a determination is made of whether the focus-compensation lens 105 is positioned at the reference position or not.

The outputs of the photosensors 128, 130 are read into the AF microcomputer 115. Each of the positions of the variator lens 102 and the focus-compensation lens 105 is detected by counting the driving pulse for the respective driving stepping motor by means of the respective counter in the AF microcomputer 115.

Also, the mounting of the wide-angle attachment lens 121 is-detected by the wide-angle attachment lens mounting detecting switch 123, and its output is sent to the AF microcomputer 115.

Figure 18:
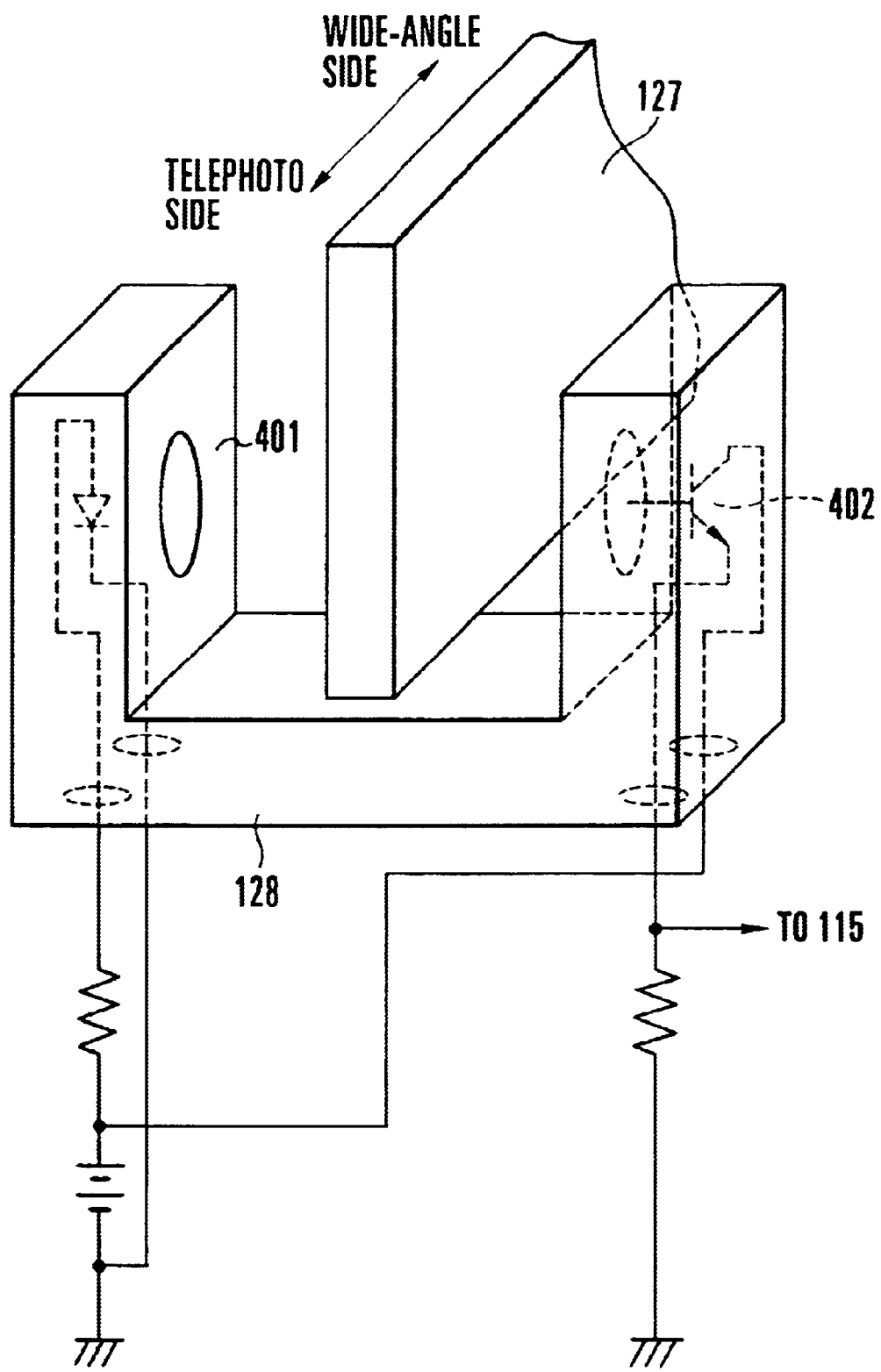
FIG. 18 is a perspective view showing the arrangement of a position detecting switch and a photosensor used in the camera of FIG. 17.

The construction and mounting arrangement of position detecting switch 127 (129) and photosensor 128 (130) are now discussed. FIG. 18 is the perspective view showing the construction and mounting arrangement of the position detecting switch and photosensor of FIG. 17.

As shown in FIG. 18, the photosensor 128 comprises an emitter element 401 for emitting light and a photosensor element 402 which faces the emitter element 401.

A path space for passing the position detecting switch 127 therethrough is formed between the emitter element 401 and the photosensor element 402. When it moves, the position detecting switch 127 transverses the path space in a manner the movement of the position detecting switch 127 is in perpendicular to the optical path from the emitter element 401 to the photosensor element 402.

When the position detecting switch 127 blocks the optical path from the emitter element 401 to the photosensor element 402, the photosensor element 402 is unable to pick up light from the emitter element 401, thereby providing an L level signal. When the position detecting switch 127 is set clear of the optical path from the emitter element 401 to the photosensor element 402, the photosensor element 402 picks up light from the emitter element 401, thereby providing an H level signal. The position at which the signal from the photosensor element 402 is transitioned in level is set as a reference position which is used to reset the position counter of the variator lens 102.

In the same way, the position of the position detecting switch 129 that transitions the output of the photosensor 130 in level is used to reset the position counter of the focus-compensation lens 105.

Figure 19:
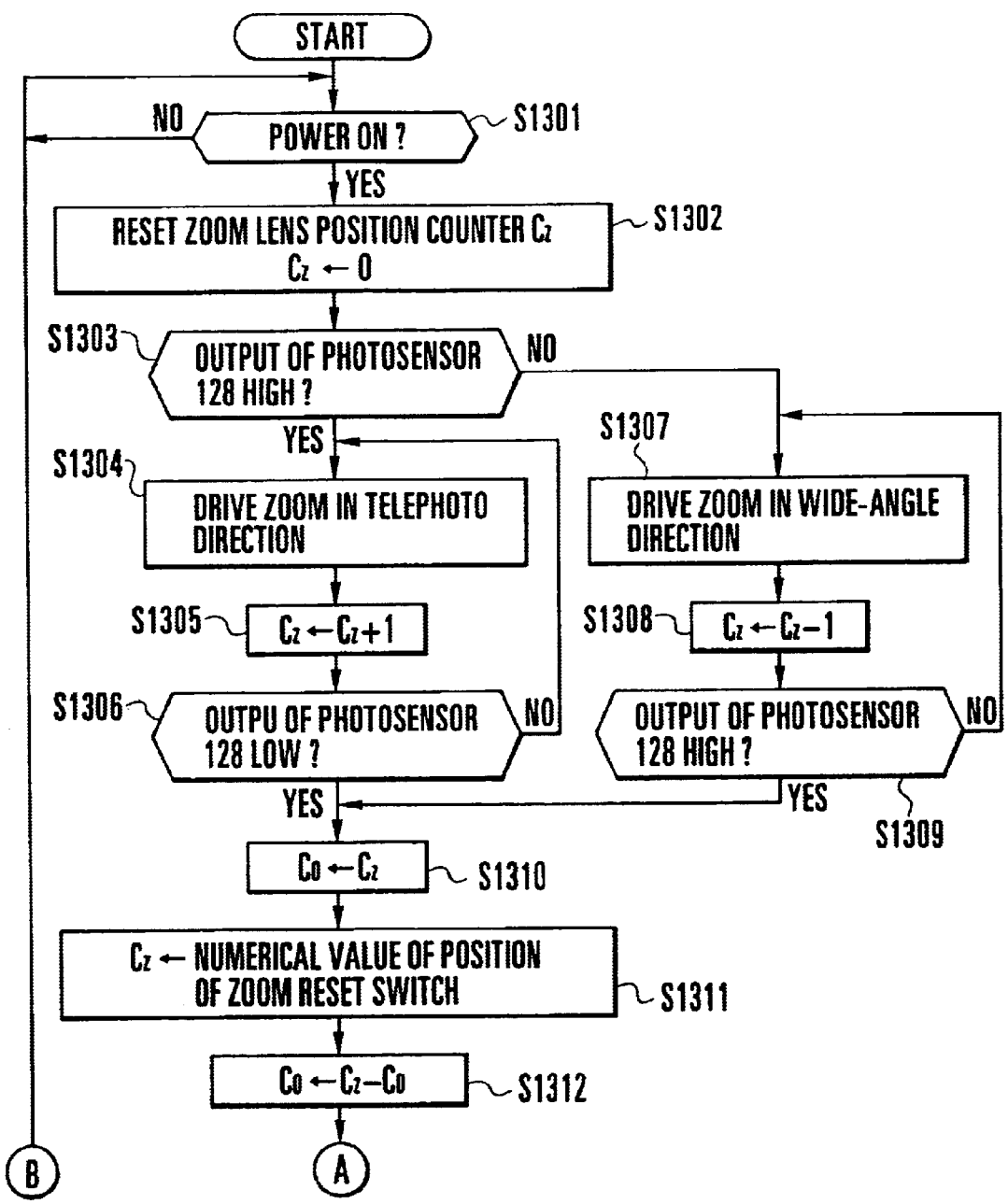
FIG. 19 is a flow diagram showing the reset operation of each lens counter in the camera of FIG. 17.
Figure 20:
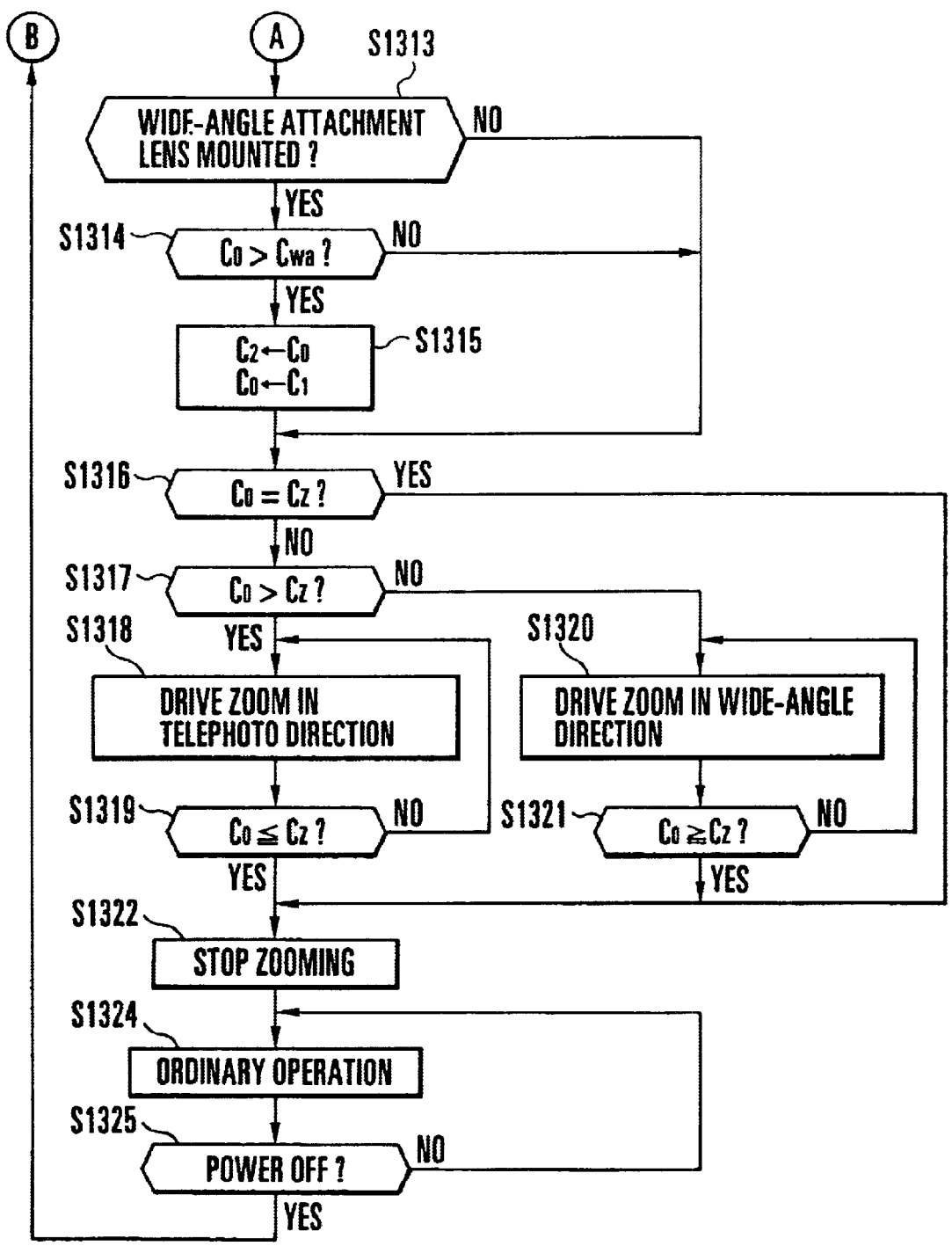
FIG. 20 is a flow diagram showing the reset operation of each lens counter in the camera of FIG. 17.

The reset operation of the lens counter for detecting the position of each lens in this embodiment of the camera is now discussed. FIGS. 19 and 20 are flow diagrams showing the reset operation of each lens counter.

The reset operation of each lens counter is executed by the AF microcomputer 115.

As shown in FIG. 19, a determination is made of whether power is switched on or not (step S1301). When power is not switched on, a wait state is kept. When power is switched on, a count Cz at a zoom lens position counter is cleared (step S1302), and a determination is made of whether the output signal of the photosensor 128 is at an H level or not (step S1303). For example, when the boundary between block and transmission of light is at the middle of the range of travel of the variator lens 102, the output signal level of the photosensor 128 identifies whether the boundary is on the telephoto side or on the wide-angle side relative to the current variator lens position. In FIG. 18, for example, if the output signal level of the photosensor 128 is at an L level, the variator lens 102 is on the telephoto side relative to the boundary. By moving the variator lens 102 toward the wide-angle side, the output signal level of the photosensor 128 is transitioned from an L level to an H level. When the output signal level of the photosensor 128 is initially at an H level, the operation is the opposite of what has been described above.

When step S1303 reveals that the output signal level of the photosensor 128 is at an H level, the variator lens 102 is moved toward the telephoto side to acquire the boundary point (step S1304). The count Cz is incremented by +1 in synchronization with the stepping pulse of the variator lens motor 118 (step S1305).

In step S1306, a determination is made of whether the output signal level of the photosensor 128 is at an L level or not. When the output signal level of the photosensor 128 is at an H level, the process starts over with step S1304.

When the output signal level of the photosensor 128 is at an L level (step S1303), the variator lens 102 is moved toward the wide-angle side to acquire the boundary point (step S1307). The count Cz is decremented by −1 in synchronism with the stepping pulse of the variator lens motor 118 (step S1308).

In step S1309, a determination is made of whether the output signal level of the photosensor 128 is at an H level or not. When the output signal level of the photosensor 128 is at an L level, the process starts over with step S1307.

When steps 1306 and 1309 verify that the output signal level of the photosensor 128 is transitioned, the count Cz is once stored as C0 into a memory (step S1310). The count Cz indicates, immediately after power on, the value of stepping pulses of the variator lens motor 118 between the position of the variator lens 102 prior to the reset operation and the position detecting switch 127, and this value represents the distance between the position of the variator lens 102 prior to power on and the position of the position detecting switch 127.

In succession, a predetermined numerical value representing the position of the position detecting switch 127 is entered into the zoom lens position counter, and reset operation ends (step S1311). The predetermined numerical value, for example, may be a pulse count of the stepping pulse of the variator lens motor 118, into which the position of the position detecting switch 127 measured relative to the original point determined from optical design viewpoint within the range of travel of the variator lens 102 is converted.

In succession to the reset operation in step S1311, the already stored C0 is subtracted from the newly determined Cz, and the result replaces C0 in the memory (step S1312). C0 is a value corresponding to the position of the variator lens 102 relative to the position of the position detecting switch 127 that is measured relative to the original point (or C0 is a value obtained by subtracting the distance between the position of the position detecting switch 127 and the position of the variator lens 102 from the position of the position detecting switch 127). Thus, to return to its initial position prior to power on, the variator lens 102 must be moved until the count Cz becomes C0.

Through steps S1307–S1309, C0 stored into the memory at step S1310 is a negative value. If C0 is processed at step S1312, the result is greater than the count Cz obtained at step S1312. This means that the position of the variator lens 102 is originally to the telephoto side, and no problem is thus presented. In this manner, the initial position of the variator lens 102 is determined.

As shown in FIG. 20, a determination is made of whether the wide-angle attachment lens 121 is mounted or not in response to the detected signal from the wide-angle attachment lens mounting detecting switch 123 (step S1313).

When the wide-angle attachment lens 121 is mounted, a determination is made of whether C0 is within the focusable focal length area with the wide-angle attachment lens mounted, based on the determination of whether the absolute lens position C0 stored in the memory is greater than Cwa or not (step S1314). Cwa corresponds to the focal length, the position 301 of the variator lens 102 in FIG. 2(b).

When C0 is greater than Cwa at step S1314, return position C0 with the wide-angle attachment lens 102 mounted is positioned to the telephoto side relative to Cwa. Thus, no focused position is found by returning the variator lens 102 back to C0. The return position C0 is once stored as C2 (this C2 is to be used in the following fifth embodiment), and C0 is set to a position C1 to the wide-angle side relative to Cwa (step S1315). C1 is acceptable as long as it is to the wide-angle side relative to Cwa. The position C1 is preferably situated at the zoom position at the wide-angle end where the performance of the wide-angle attachment lens 121 is fully exploited.

Steps S1313 through S1315 are summarized as follows: when power is switched on with the wide-angle attachment lens 121 mounted, and with the position of the variator lens 102 within the focusable focal length area, the variator lens 102 continuously stays there; when power is switched on with the wide-angle attachment lens 121 mounted and with the position of the variator lens 102 not within the focusable focal length area, the variator lens 102 is forced to move to the position C1 within the focusable focal length area; then, the image output is allowed to phase-into the normal operation. During forced driving of the variator lens 102, the AF microcomputer 115 controls the LCD display circuit 110 and the camera signal processing circuit 108 to disable video signal output.

After resetting C0 again at step S1315, when the wide-angle attachment lens 121 is not mounted or when C0 is not greater than Cwa, a determination is made of whether the return position C0 is equal to a reset value Cz or not (step S1316). When the return position C0 is equal to the reset value Cz, the variator lens 102 is already at the return position, and thus movement of the variator lens 102 is stopped (step S1322).

When the return position C0 is not equal to the reset value Cz at step S1316, a determination is made of whether the return position C0 is greater than the reset value Cz (step S1317). When the return position C0 is greater than the reset value Cz, the variator lens 102 is moved to the telephoto side based on the determination that the return direction is to the telephoto side (step S1318).

In succession, a determination is made of whether the return position C0 is equal to or smaller than Cz (step S1319). When the return position C0 is equal to or smaller than Cz, the movement of the variator lens 102 is stopped (step S1322) based on the determination that the variator lens 102 has already reached the return position C0. When the return position C0 is greater than Cz, the process starts over with step S1318 based on the determination that the variator lens 102 has yet to reach the return position C0.

When the return position C0 is smaller than the reset value Cz, the variator lens 102 is moved to the wide-angle side based on the determination that the return direction is to the wide-angle side (step S1320).

In succession, a determination is made of whether the return position C0 is equal to or greater than Cz (step S1321). When the return position C0 is equal to or greater than Cz, the movement of the variator lens 102 is stopped based on the determination that the variator lens 102 has already reached the return position C0 (step S1322). When the return position C0 is smaller than Cz, the process starts over with step S1320 based on the determination that the variator lens 102 has yet to reach the return position C0.

In succession to the stop of movement of the variator lens 102, the ordinary operation of the camera takes place (step S1324). Now that the entire lens reset operation is complete, a photographed image is output in the ordinary photographing activity.

In succession, a determination is made of whether power is interrupted or not (step S1325). When power is interrupted, the program returns to step S1301. When power is not interrupted, the ordinary operation is continued.

The fourth embodiment of the present invention thus controls the unfocused image that could be created due to the forced zoom operation when power is switched on with the wide-angle attachment lens mounted. The embodiment also avoids an operator's confusion attributed to the fact that the mounting of the wide-angle attachment lens goes unnoticed, and offers an improved image quality and improved automatic focus adjustment performance.

(Fifth Embodiment)

Referring to drawings, a fifth embodiment of the present invention is discussed.

In the fourth embodiment, the reset operation of the zoom lens position counter has been described. The same reset operation can be applied to a focus lens position counter. When the automatic focus adjustment mode is initiated after power on, the automatic focus adjustment mode follows the reset operation. Therefor, there is no need for the focus-compensation lens 105 to revert back to its initial position after resetting the focus lens position counter. As long as the return operation of the variator lens 102 follows the flow diagrams in FIGS. 19 and 20, its focused state will be achieved even if the variator lens 102 is at any position. With no automatic focus adjustment mode initiated, however, an unfocused state takes place if the focus-compensation lens 105 is not moved back to its initial position. In particular, when the wide-angle attachment lens is mounted, the focusable focal length area is shifted from one in FIG. 2(a) to another in FIG. 2(b). If the focus-compensation lens 105 is not moved back to its focused position corresponding to the return position of the variator lens 102, a large degree of unfocused state will be created.

The construction of the camera in this embodiment remains unchanged from that in the fourth embodiment.

Figure 21:
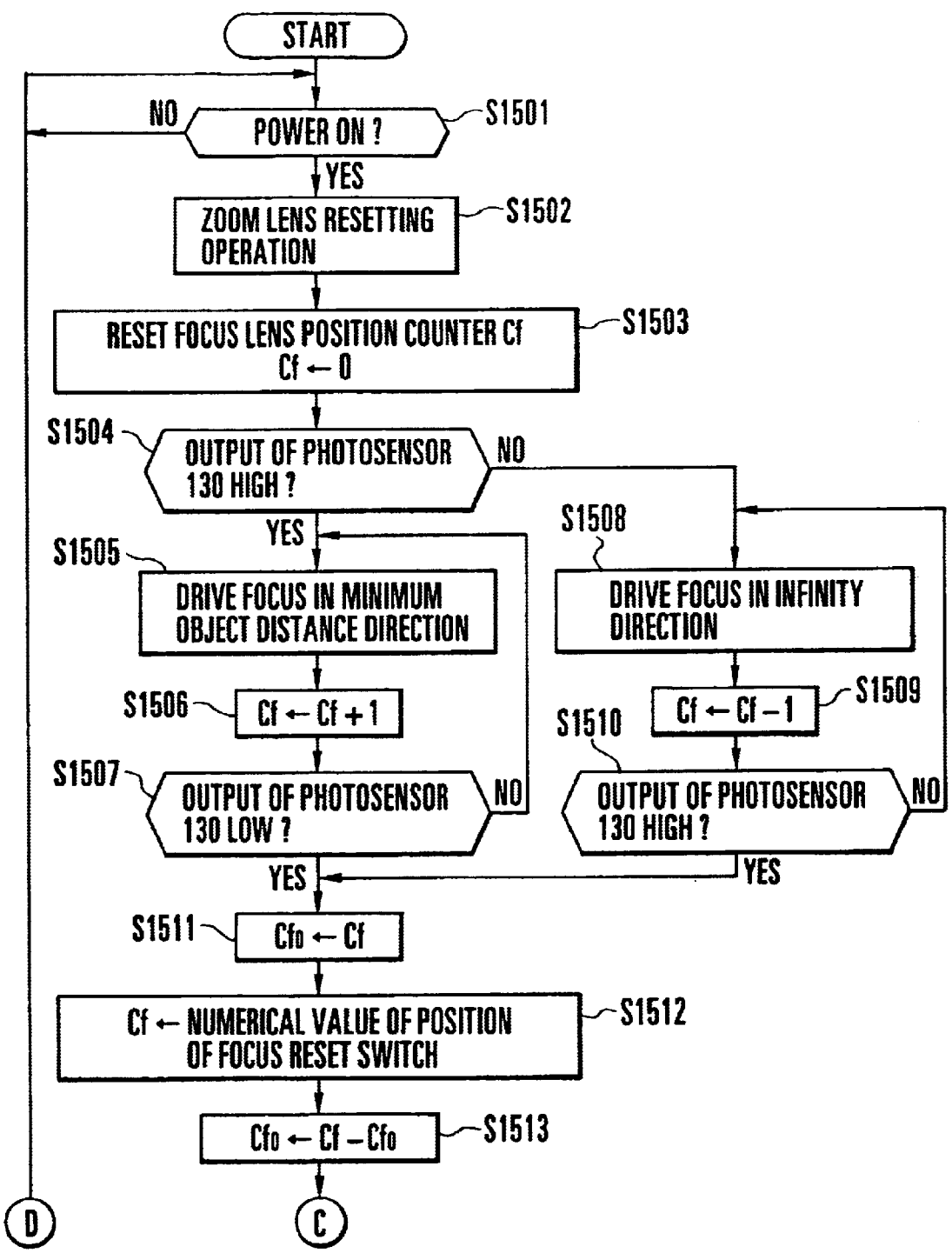
FIG. 21 is a flow diagram showing the reset operation at the manual mode startup in the camera according to a fifth embodiment of the present invention with the wide-angle attachment lens mounted.
Figure 22:
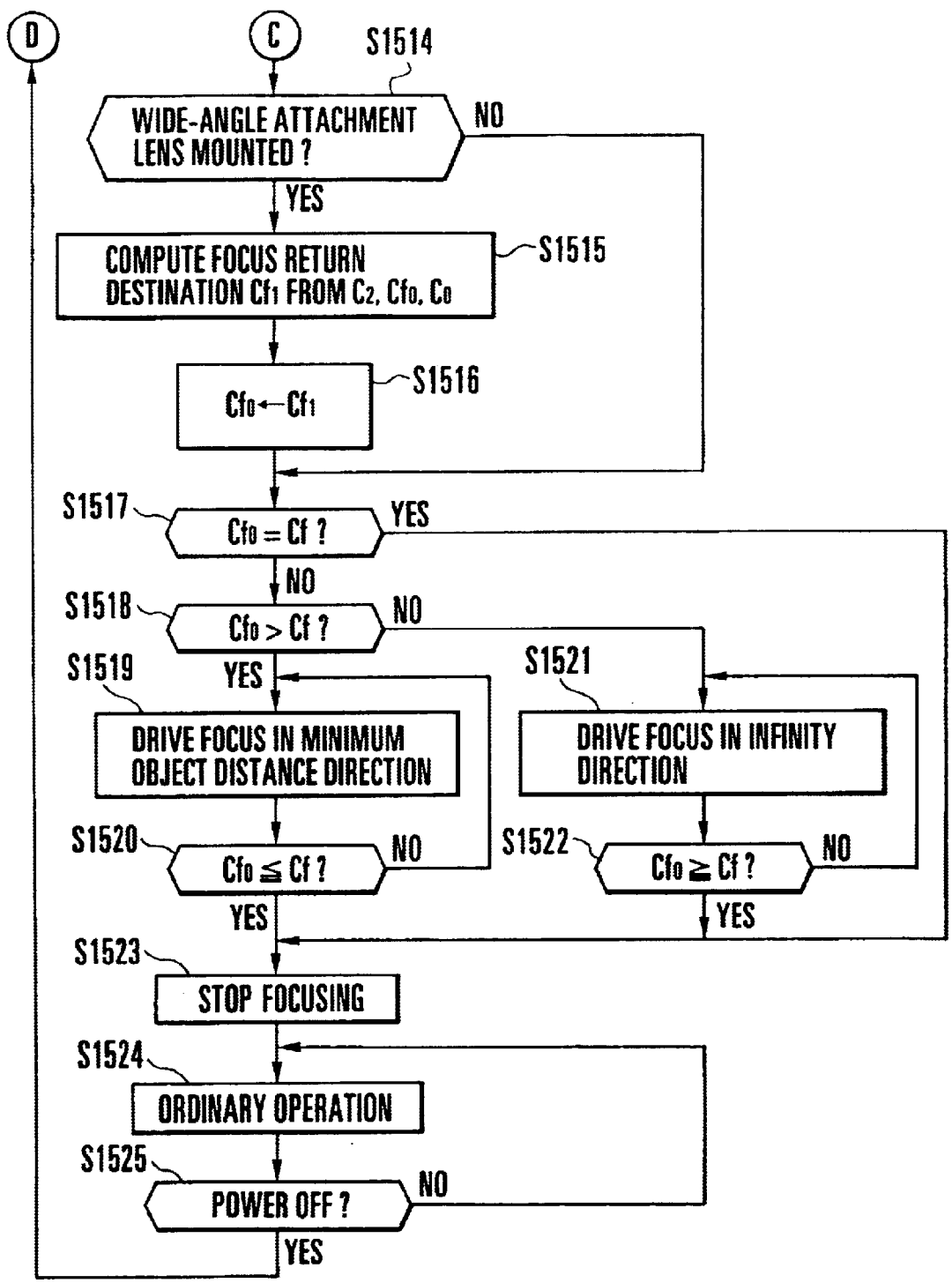
FIG. 22 is a flow diagram showing the reset operation at the manual mode startup in the camera according to the fifth embodiment of the present invention with the wide-angle attachment lens mounted.

Discussed below is the reset operation in this embodiment of the camera which is started in a manual mode with the wide-angle attachment lens mounted. FIGS. 21 and 22 are flow diagrams showing the reset operation at the manual mode startup in the camera according to the fifth embodiment of the present invention with the wide-angle attachment lens mounted. The circuit configuration of the camera in the fifth embodiment remains unchanged from that in FIG. 17. This embodiment differs from the previous embodiments in the process algorithm of the AF microcomputer 115. The reset operation of the focus-compensation lens position counter is controlled by the AF microcomputer 115.

As shown in FIG. 21, a determination is made of whether power is switched on or not (step S1501). When power is not switched on, a wait state is kept. When power is switched on, the zoom lens position counter is reset (step S1502). In succession, a count Cf of the focus lens position counter is cleared (step S1503), and a determination is made of whether the output signal of the photosensor 130 is at an H level or not (step S1304). For example, when the boundary between block and transmission of light is at the middle of the range of travel of the focus-compensation lens 105, the output signal level of the photosensor 130 identifies whether the boundary is on the infinity side or on the minimum side relative to the current focus-compensation lens position. In FIG. 18, for example, if the output signal level of the photosensor 130 is at an L level with light blocked, the focus-compensation lens 105 is on the infinity side relative to the boundary. By moving the focus-compensation lens 105 toward the minimum side, the output signal level of the photosensor 130 is transitioned from an L level to an H level. When the output signal level of the photosensor 130 is initially at an H level, the operation is the opposite of what has been described above.

When the output signal level of the photosensor 130 is at an H level, the focus-compensation lens 105 is moved toward the minimum side to acquire the boundary point (step S1504). The count Cf is incremented by +1 in synchronization with the stepping pulse of the focus-compensation lens motor 120 (step S1506).

In succession, a determination is made of whether the output signal level of the photosensor 130 is at an L level or not (step S1507). When the output signal level of the photosensor 130 is at an H level, the process starts over with step S1605.

When the output signal level of the photosensor 130 is at an L level (step S1504), the focus-compensation lens 105 is moved toward the infinity side to acquire the boundary point (step S1508). The count Cf is decremented by −1 in synchronism with the stepping pulse of the focus-compensation lens motor 120 (step S1510).

In succession, a determination is made of whether the output signal level of the photosensor 130 is at an H level or not (step S1510). When the output signal level of the photosensor 130 is at an L level, the process starts over with step S1508.

When a transitioned output signal level of the photosensor 130 is verified, the count Cf is once stored as Cf0 into a memory (step S1511). The count Cf0 indicates, immediately after power on, the value of stepping pulses of the focus-compensation lens 105 between the position of the focus-compensation lens 105 prior to the reset operation and the position detecting switch 129, and this value represents the distance between the position of the focus-compensation lens 105 prior to power on and the position of the position detecting switch 129.

In succession, a predetermined numerical value representing the position of the position detecting switch 129 is entered into the focus lens position counter, and reset operation ends (step S1512). The predetermined numerical value, for example, may be a pulse count of the stepping pulse of the focus-compensation lens motor 120, into which the position of the position detecting switch 129 measured relative to the original point determined from optical design viewpoint within the range of travel of the focus-compensation lens 105 is converted.

In succession to the reset operation in step S1512, the already stored Cf0 is subtracted from the newly determined Cf, and the result replaces Cf0 in the memory (step S1513). Cf0 is a value corresponding to the position of the focus-compensation lens 105 relative to the position of the position detecting switch 129 that is measured relative to the original point (or Cf0 is a value obtained by subtracting the distance between the position of the position detecting switch 129 and the position of the focus-compensation lens 105 from the position of the position detecting switch 129). Thus, to return to its initial position prior to power on, the focus-compensation lens 105 must be moved until the count Cf becomes Cf0.

Through steps S1508–S1510, Cf0 stored into the memory at step S1511 is a negative value. If Cf0 is processed at step S1513, the result is greater than the count Cf obtained at step S1513. This means that the position of the focus-compensation lens 105 is originally to the infinity side, and no problem is thus presented. In this manner, the initial position of the focus-compensation lens 105 is determined.

As shown in FIG. 22, a determination is made of whether the wide-angle attachment lens 121 is mounted or not in response to the detected signal from the wide-angle attachment lens mounting detecting switch 123 (step S1514).

When the wide-angle attachment lens 121 is mounted, the return position Cf1 of the focus-compensation lens 105 is determined from the absolute lens position Cf0 stored in the memory, the return position C0 of the variator lens 102 and C2 (step S1515). The determined return position Cf1 of the focus-compensation lens 105 is stored as Cf0 (step S1516).

In succession, a determination is made of whether the return position Cf0 is equal to the value Cf or not (step S1517). When the return position Cf0 is equal to the value Cf, the focus-compensation lens 105 has already arrived at the return position, and the movement of the focus-compensation lens 105 is stopped (step S1523).

When the return position Cf0 is not equal to the reset value Cf, a determination is made of whether the return position Cf0 is greater than the reset value Cf (step S1518). When the return position Cf0 is greater than the reset value Cf, the focus-compensation lens 105 is moved to the minimum side based on the determination that the return direction of the focus-compensation lens 105 must be to the minimum side (step S1519).

Next, a determination is made of whether the return position Cf0 is equal to or smaller than Cf (step S1520). When the return position Cf0 is equal to or greater than Cf, the movement of the focus-compensation lens 105 is stopped (step S1523) based on the determination that the focus-compensation lens 105 has already arrived at the return position Cf0. When the return position Cf0 is greater than Cf, the process starts over with step S1519.

When the return position Cf0 is smaller than the reset value Cf, the focus-compensation lens 105 is moved to the infinity side based on the determination that the return direction of the focus-compensation lens 105 is to the infinity side (step S1521).

Next, a determination is made of whether the return position Cf0 is equal to or greater than Cf (step S1522). When the return position Cf0 is equal to or greater than Cf, the movement of the focus-compensation lens 105 is stopped based on the determination that the focus-compensation lens 105 has already arrived at the return position Cf0 (step S1523). When the return position Cf0 is smaller than Cf, the process starts over with step S1521.

In succession to the stop of movement of the focus-compensation lens 105, the ordinary operation of the camera takes place (step S1514). In the ordinary operation, a photographed image is output in the ordinary photographing activity.

In succession, a determination is made of whether power is interrupted or not (step S1525). When power is interrupted, the program returns to step S1501. When power is not interrupted, the ordinary operation is continued.

The unfocused image that could be created due to the forced zoom operation when power is switched on with the wide-angle attachment lens mounted is thus prevented.

Discussed next is the method of calculating the return position Cf1 of the focus-compensation lens 105 with the wide-angle attachment lens mounted in connection with step S1515.

Figure 23:
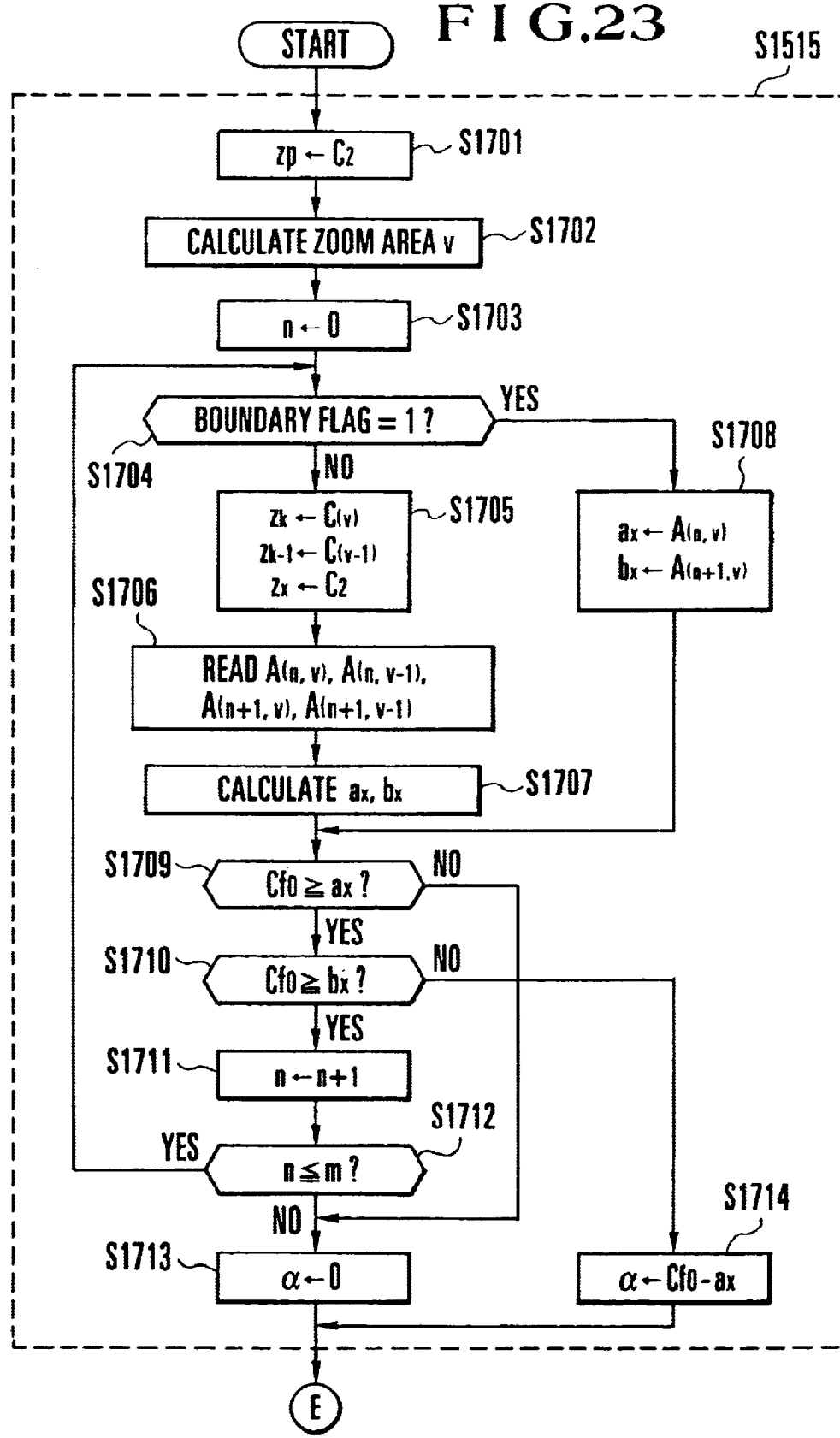
FIG. 23 is a flow diagram showing the calculation method of a return position of the focus-compensation lens with the wide-angle attachment lens mounted.
Figure 24:
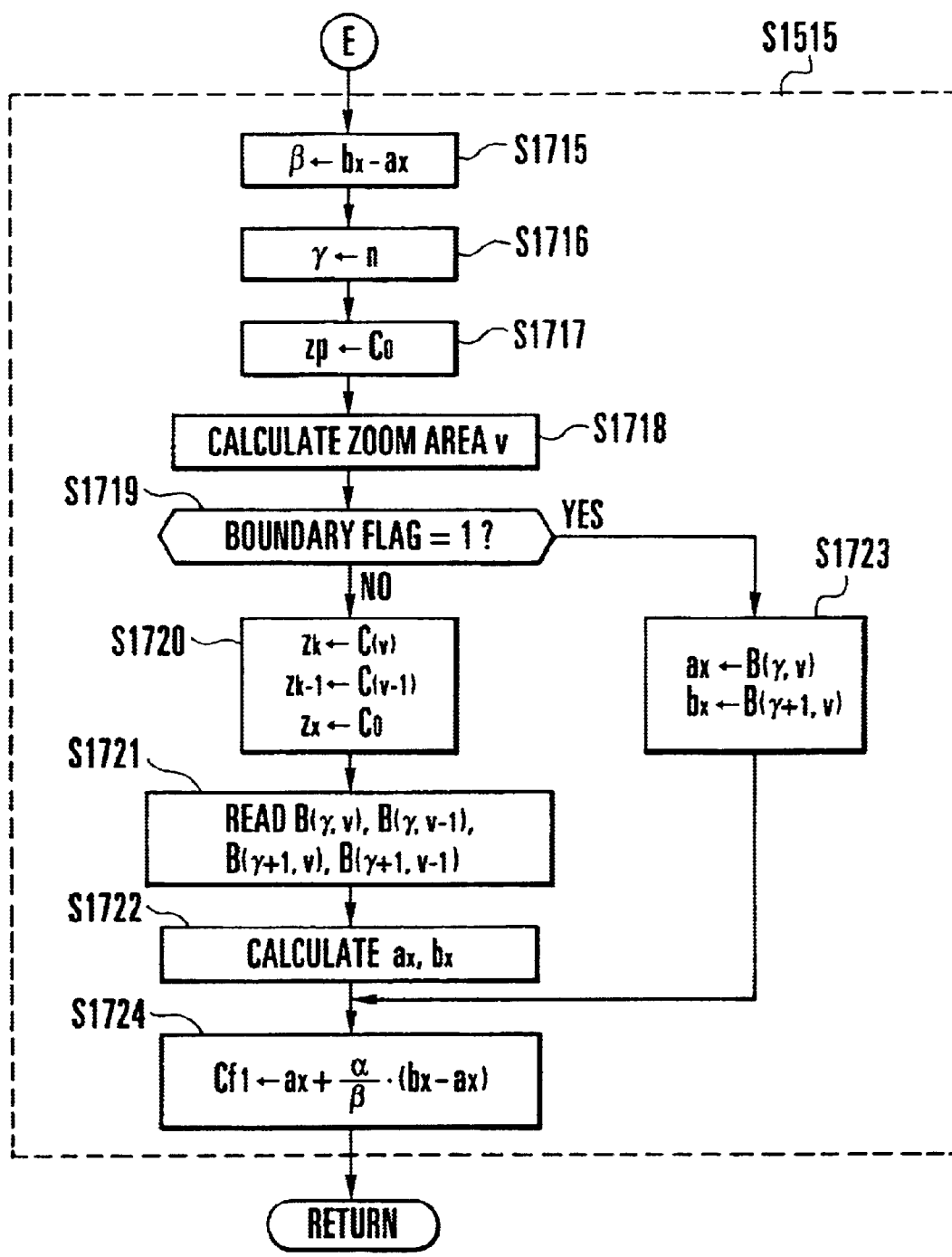
FIG. 24 is a flow diagram showing the calculation method of a return position of the focus-compensation lens with the wide-angle attachment lens mounted.
Figure 25:
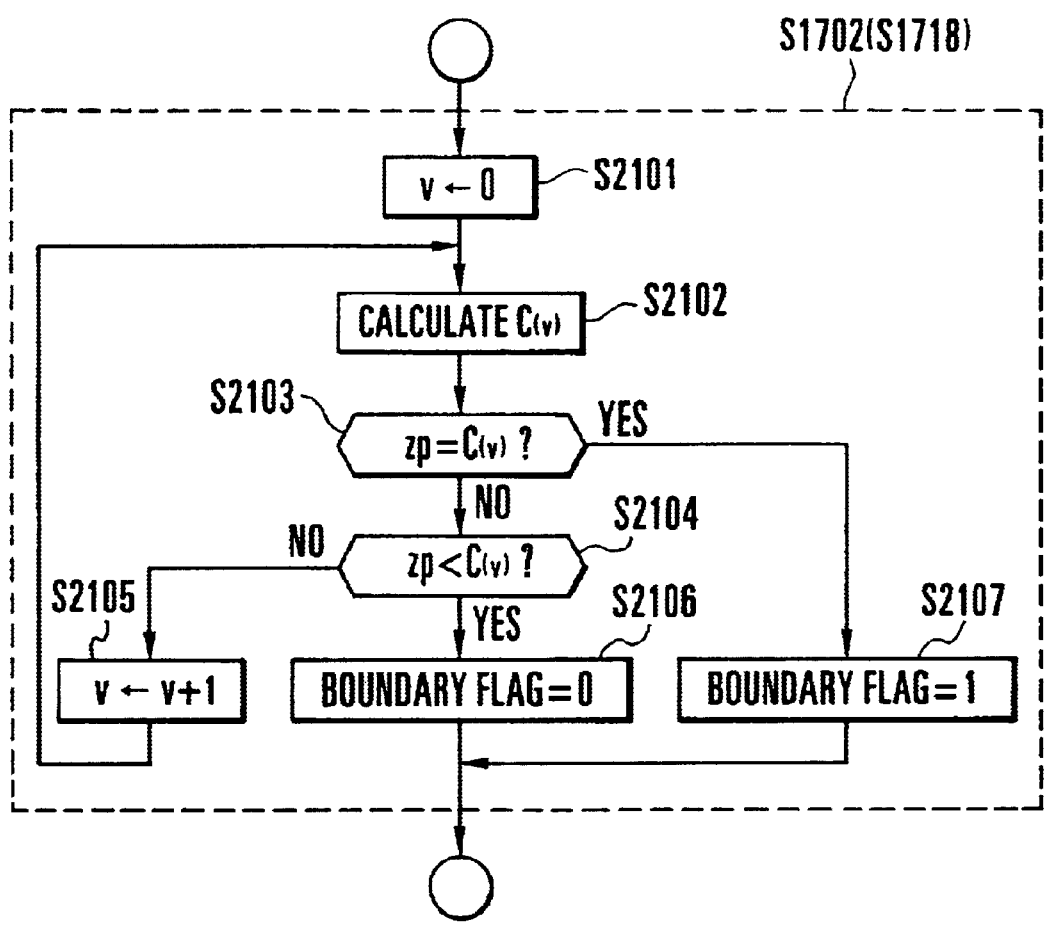
FIG. 25 is a flow diagram showing the routine for calculating the zoom area of FIG. 23.

FIGS. 23 and 24 are flow diagrams showing the calculation method of a return position of the focus-compensation lens with the wide-angle attachment lens mounted. FIG. 25 is a flow diagram showing the routine for calculating the zoom area v of FIG. 23.

In step S1515, the return position Cf1 of the focus-compensation lens with the wide-angle attachment lens 105 mounted is calculated. The focal length and object distance that were used are determined referring to the locus, stored in the AF microcomputer 115, which represents a plot of the position of the variator lens 102 and the position of the focus-compensator lens 105 prior to power on. When the mounting of the wide-angle attachment lens changes the focal length (step S1514), the return position Cf1 of the focus-compensation lens 105 to keep a focused state under the same object distance is determined (for example, a focused position Cf1 is obtained by determining a position in FIG. 2(b) corresponding to position 303 in FIG. 2(a)).

The AF microcomputer 115 stores the plurality of loci shown in FIGS. 2(a) and 2(b) in the form of tabled data shown in FIGS. 9(a) and 9(b) in the same manner as in the first to third embodiments.

The tabled data in FIG. 9(a) are related to the locus data in FIG. 2(a), and the tabled data in FIG. 9(b) are related to the locus data in FIG. 2(b). Data belonging to a single column is used to plot a corresponding single locus. In FIG. 9(b), the row n represents object distance, and the column v represents the zoom position (focal length). The infinity object distance is represented by n=0, a 1 cm object distance by n=m, and the wide-angle end by v=0. As v increases, the focal length increases. The zoom position at the telephoto end is represented by v=s. (The zoom position designated by 301 in FIG. 2 corresponds to v=t.) Thus, data of a single column gives a plot of a single locus.

Discussed below referring to FIGS. 23 and 24 is the calculation method of the return position Cf1 of the focus-compensation lens 105 with the wide-angle attachment lens 121 mounted.

As seen from FIG. 23, the position C2 of the variator lens 102 prior to power on is stored as zp (step S1701). In succession, the zoom area calculation is performed to determine the zoom area v in the tabled data in which the position zx of the variator lens 102 lies (step S1702).

As shown in FIG. 25, in the zoom area calculation, the zoom area variable v is initialized by resetting it to "0" (step S2101). From Equation (5), the zoom positions C(v) at boundaries between zoom areas v are calculated (step S2102). The zoom positions C(v) correspond to z0, z1, z2, . . . shown in FIG. 3.

C(v)=(Telephoto end zoom position−Wide-angle end zoom position)*v/s+Wide-angle end zoom position Here, the division operation by the value s is to equally divide the overall range of travel of the variator lens by the zoom area number s in FIG. 9(a).

In succession to the calculation of zoom positions C(v), a determination is made of whether the position zp of the variator lens 102 equals the position C(v) (step S2103). When the position zp of the variator lens 102 equals the zoom position C(v), a boundary flag is raised to "1" based on the determination that the position zp of the variator lens 102 lies on the boundary of the area v (step S2107). This completes step S1702.

When the position zp of the variator lens 102 is not equal to the zoom position C(v), a determination is made of whether the position zp of the variator lens 102 is smaller than the position C(v) (step S2104). When the position zp of the variator lens 102 is smaller than C(v), the boundary flag is set to "0" (step S2106) based on the determination that the position zp of the variator lens 102 is somewhere between C(v−1) and C(v). This completes step S1702.

When the position zp of the variator lens 102 is not smaller than the zoom position C(v), the zoom area v is incremented (step S2105), and the same processing starts over with step S2102. The above processing determines if the current position zp of the variator lens 102 lies in the zoom area of v=k in the table shown in FIG. 9(b), and further if the current position zp of the variator lens 102 lies on the boundary of the zoom area of v=k.

In succession to the zoom area calculation, the object distance n is set to "0" (step S1703), and a determination is made of whether the current position of the variator lens 102 is on the boundary or not based on the boundary flag (step S1704). When the boundary flag is set to "0," the current position of the variator lens 102 is considered to be not on the boundary of the zoom area. When the boundary flag is set to "1," the current position of the variator lens 102 is considered to be on the boundary of the zoom area.

Figure 3:
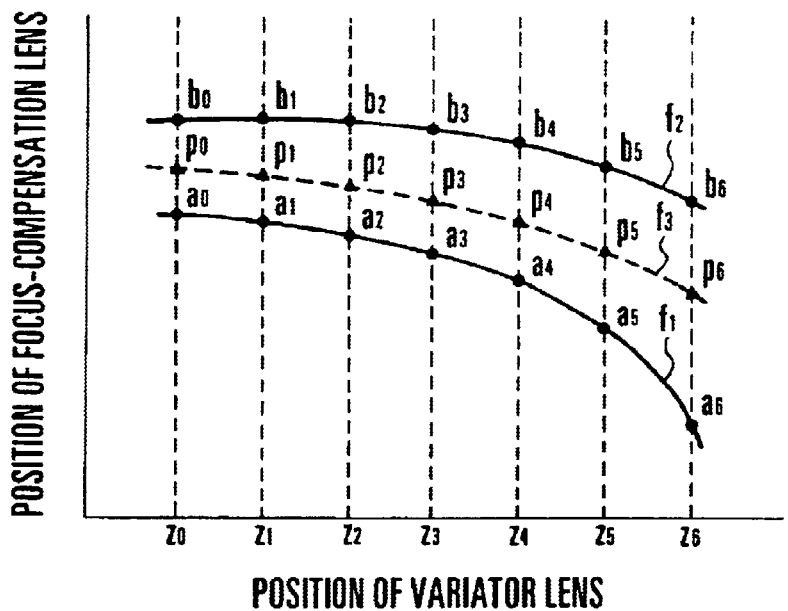
FIG. 3 shows the relationship between the position of the variator lens and the position of the focus-compensation lens with no wide-angle attachment lens mounted in FIG. 1.

When the boundary flag is "0," the zoom position C2 is an intermediate position having no corresponding data in FIG. 3 and FIGS. 9(a) and 9(b). In this case, the data in FIGS. 9(a) and 9(b) need interpolating according to the variable v along the row to be used as data for true focused position data.

Figure 4:
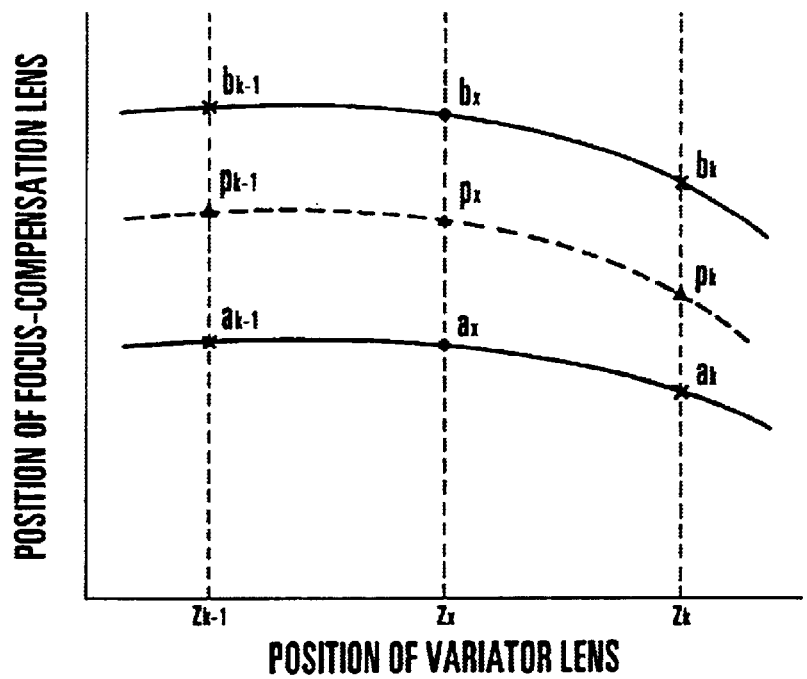
FIG. 4 shows the relationship between the position of the variator lens and the position of the focus-compensation lens with no wide-angle attachment lens mounted in FIG. 1.

FIG. 4 is used to determine true focused position data. In FIG. 4, the ordinate and the abscissa represent the focus-compensation lens position and the variator lens position, respectively. In representative locus positions stored in the AF microcomputer 115, the variator lens positions are z0, . . . , zk−1, zk, . . . , zs, and the focus-compensation lens positions are a0, ak−1, ak, . . . , as, b0, . . . , bk−1, bk, . . . , bs.

When the position zx of the variator lens 102 is not on any of the zooming boundaries, and when the focus-compensation lens 105 is positioned at px, both ax and bx are given by the already described equations (2) and (3).

$$ax=ak-(zk-zx)*(ak-ak-1)/(zk-zk-1)$$

$$bx=bk-(zk-zx)*(bk-bk-1)/(zk-zk-1)$$

According to the interior division ratio determined by the variator lens position zx between two zoom boundaries (zk and zk−1), ax and bx are determined by interpolating four tabled data stored with respect to the same object distance.

When the boundary flag is "0," zk=C(v), zk−1=C(v−1), zx=C2 (step S1705).

Then, four tabled data, A(n,v−1), A(n,v), A(n+1,v−1), and A(n+1,v) are read (step S1706). From Equations (2) and (3), ax and bx are calculated (step S1706).

When the boundary flag is "1," the object distance n, focused position of the focus-compensation lens 105 A(n,v), A(n+1,v) relative to the variator lens 102 are read, and A(n,v) and A(n+1,v) are stored as ax and bx (step S1708).

In succession to the calculation of ax and bx, a determination is made of whether the position Cf0 of the focus-compensation lens 105 prior to power on is greater than ax or not (step S1709). When the Cf0 is greater than ax, a determination is made of whether Cf0 is greater than bx (step S1710).

When Cf0 is greater than bx, namely that Cf0 is positioned closer to the minimum side, the object distance n is incremented (step S1711). A determination is made of whether the object distance n is equal to or smaller than a minimum object distance m (step S1712). When the object distance n is equal to or smaller than the minimum object distance m, the processing starts over with step S1704. When the object distance n is not equal to nor smaller than the minimum object distance m, Cf0 is at the super-minimum position, and locus parameter a is stored as "0" (step S1713).

Locus parameter β is given as a difference, bx−ax, and then stored (step S1715). The storing of locus parameter β is followed by storing the object distance n as locus parameter γ (1716).

When Cf0 is not greater than ax (step S1709), Cf0 is at the super-infinity position. "0" is stored as locus parameter α, the difference, bx−ax, is stored as locus parameter β, and the object distance n is stored as locus parameter γ (steps S1713, S1715 and S1716).

When Cf0 is not greater than bx (step S1710), Cf0 must lie between the object distances n and n+1. The difference, Cf0−ax, is stored as locus parameter a (step S1714). The difference, bx−ax, is stored as locus parameter β, and the object distance n as locus parameter γ (steps S1715 and S1716).

Locus parameters, α, β, and γ representing where the position of the variator lens 102 and the position of the focus-compensation lens 105 are on the locus are sequentially updated and stored and then used as the object distance information immediately before the mounting of the wide-angle attachment lens.

The zoom position C0 forced to move within the focusable focal length area with the wide-angle attachment lens mounted is stored as zp in the memory (step S1717), and the zoom area is calculated (step S1718). The zoom area v thus calculated satisfies the relationship, $0 \leq v \leq t$.

In succession to the zoom area calculation, a determination is made of whether C0 lies on the boundary or not based on the boundary flag (step S1719). When the boundary flag is set to "0," C0 is considered to be not on the boundary of the zoom area. When the boundary flag is set to "1," C0 is considered to be on the boundary of the zoom area.

When the boundary flag is "0," zk=C(v), C(v−1)=Zk−1, zx=C0 (step S1720).

The four tabled data, B(γ,v−1), B(γ,v), B(γ+1,v−1) and B(γ+1,v) are read (step S1721). ax and bx are determined from Equations (2) and (3) (step S1722).

When the boundary flag is "1," B(γ,v) is stored as ax and B(γ+1,v) is stored as bx (step S1723).

After the calculation of ax and bx, the position Cf1 of the focus-compensation lens to keep focused state with the wide-angle attachment lens 121 mounted is determined from Equation (9) below (step S1724).

$$Cf1 = ax + (bx-ax) * \alpha/\beta \qquad (9)$$

By performing the lens reset operation as described above when the wide-angle attachment lens 121 is mounted, unfocused state is prevented when image output is initiated with no automatic focus adjustment mode activated.

As described above, in the camera according to the embodiment of the present invention, reference position shifting means shifts the reference position from the predetermined reference position to a reference position corresponding to the second focal length area when the conversion lens group is mounted on the zoom lens unit. This arrangement avoids an operator's confusion attributed to the fact that the mounting of the wide-angle attachment lens goes unnoticed, and offers an improved image quality and improved automatic focus adjustment performance.

Furthermore, in the camera according to the above embodiment, initialization of the position detecting means is performed by shifting the compensation lens group to the reference position. Thus, the error in position sensing by the position detecting means is controlled.

Furthermore, in the camera according to the above embodiment, the reference position shifting means sets the reference position to the position of the compensation lens group prior to initialization of the position detecting means to keep focused state. The occurrence of unfocused state involved in the forced zoom movement with the conversion lens group mounted is controlled.

What is claimed is:

1. A lens control device comprising:
   (A) a first lens movable for varying power;
   (B) a second lens for compensating for a change in position of a focal position due to the movement of the first lens;
   (C) a memory which stores information about a plurality of loci of the second lens to keep focused state during the movement of the first lens;
   (D) a third lens mounted in an optical axis of the first and second lenses in a detachable manner; and
   (E) control means for changing a movable range of the first lens from a first range to a second range in response to the mounting of the third lens to restrict the movable range of the first lens such that the second lens is able to move and compensate the change of the focal position due to the movement of the first lens in the second range in response to the movement of the first lens from the first range to the second range,
   wherein said control means, when the first lens is moved from the first range to the second range, controls the second lens to move according to the locus on which the second lens has been tracing during the first lens has positioned within the first range.

2. The lens control device according to claim 1, wherein said control means has a memory which stores information about a locus of the second lens to keep focused state during the movement of the first lens within the first range, and controls the second lens based on the locus within the first range when the first lens is moved from the first range to the second range.

3. The lens control device according to claim 1, wherein said control means has a memory which stores information about a locus of the second lens to keep focused state during the movement of the first lens within the first range, and controls the second lens based on a corrected version of said locus within the first range when the first lens is moved from the first range to the second range.

4. The lens control device according to claim 1, wherein said control means has a memory which stores information about a locus of the second lens to keep focused state during the movement of the first lens within the first range and information about a locus of the second lens to keep focused state during the movement of the first lens within the second range, and controls the second lens based on the locus within the memory corresponding to the range within which the first lens is positioned.

5. The lens control device according to claim 1, wherein said control means has a memory which stores information about a locus of the second lens to keep focused state during the movement of the first lens within the first range and information about a locus of the second lens to keep focused state during the movement of the first lens within the second range of the first lens, detects an object distance corresponding to the position of the second lens immediately before the mounting of the wide-angle attachment lens when the wide-angle attachment lens is mounted, selects the locus corresponding to the determined object distance from the loci of the second lens during the movement of the first lens within the second range stored in the memory when the first lens is moved to the second range, and controls the second lens based on the selected locus.

6. The lens control device according to claim 1, wherein said second range is set to a wide-angle side relative to the first range.

7. The lens control device according to claim 6, wherein said wide-angle attachment lens shifts to the wide-angle side the range of travel of the first lens that is focusable with the second lens.

8. A lens control device comprising:
(A) a variator lens movable for varying power;
(B) a compensating lens for compensating a change in position of a focal plane due to the movement of the variator lens;
(C) a memory which stores information about a plurality of loci of the compensating lens to keep focused state during the movement of the variator lens; and
(D) control means for controlling a driving direction and a driving speed of the compensating lens during the variator lens is being moved from a first movable range to a second movable range to restrict a movable range of the variator lens, by using information of a locus on which the compensating tens has traced in a state that the variator lens moved in the first movable range during the shifting in the first range, when the movable range of the variator lens is shifted from the first range to the second range.

9. The lens control device according to claim 8, wherein said control means moves the variator lens from the first range to the second range when a conversion lens for modifying focal length is mounted.

10. The lens control device according to claim 9, wherein said conversion lens is a wide-angle attachment lens which shifts focal length toward a wide-angle side.

11. The lens control device according to claim 9, wherein said second range is set toward a wide-angle side relative to the first range, and said conversion lens is a wide-angle attachment lens which shifts the range of travel of the variator lens toward the wide-angle side.

12. The lens control device according to claim 8, wherein said control means comprises a first memory for storing information about a locus of the compensating lens to keep focused state during the movement of the variator lens within said first range and a second memory for storing information about a locus of the compensating lens to keep focused state during the movement of the variator lens within said second range, and controls the compensating lens according to the stored information in either the first memory or second memory corresponding to the position of the variator lens.

13. The lens control device according to claim 12, wherein said control means controls the compensating lens based on one of the loci of the compensating lens within the first range, said one of the loci being closest to the second range, when the range of travel of the variator lens is shifted from the first range to the second range.

* * * * *

UNITED STATES PATENT AND TRADEMARK OFFICE
CERTIFICATE OF CORRECTION

PATENT NO. : 6,744,468 B2
APPLICATION NO. : 09/006567
DATED : June 1, 2004
INVENTOR(S) : Hiroto Ohkawara It is certified that error appears in the above-identified patent and that said Letters Patent is hereby corrected as shown below:

Column 1, line 15, delete "camera is the one" and insert --camera is one--

Column 1, line 49, delete "with the optical axis of its own by the driving means" and insert --with its optical axis by the driving means- -

Column 1, line 61, delete "both are aligned" and insert --both to be aligned--

Column 2, line 67, delete "in its one direction" and insert --in one of its directions--

Column 3, line 15, delete "bx=bk-(zk-zk)" and insert --bx=bx-(zk-zx)--

Column 3, line 54 and line 57, delete "as parameter" and insert --as a parameter--

Column 4, line 8, delete "and zooming" and insert --and a zooming--

Column 4, line 13 and line 16, delete "as parameter" and insert --as a parameter--

Column 4, line 35, delete "and varied field" and insert --and a varied field--

Column 4, lines 50-51, delete "for in a focused position" and insert --for, in a focused position,--

Column 4, line 66, delete "when the variator lens group is mounted" and insert --when the conversion lens group is mounted--

Column 7, lines 6-7, delete "along the optical axis of its own by a" and insert --along its optical axis by a--

Column 7, line 22, delete "with the optical axis of its own by a" and insert --with its optical axis by a- -

Column 7 line 49, "controls openness of the iris" and insert --controls opening of the iris--

Column 7, line 53, delete "openness of the iris" and insert --opening of the iris--

Column 7, line 57, delete "from video" and insert --from the video--

Column 7, line 65, delete "has the general" and insert --has general--

Column 8, line 21, delete "has a general" and insert - -has general--

Column 8, line 47, delete "from-the" and insert - -from the--

UNITED STATES PATENT AND TRADEMARK OFFICE
CERTIFICATE OF CORRECTION

PATENT NO. : 6,744,468 B2
APPLICATION NO. : 09/006567
DATED : June 1, 2004
INVENTOR(S) : Hiroto Ohkawara It is certified that error appears in the above-identified patent and that said Letters Patent is hereby corrected as shown below:

Column 8 line 61. delete "FIGS. 5 and 6" and insert --FIGS. 6 and 7--

Column 9, line 13, delete "present each necessary" and insert --present all necessary--

Column 13, line 67, delete "FIGS. 11 and 12" and insert --FIGS. 10 and 11--

Column 14, line 43, delete "the-column" and insert --the column--

Column 15, line 31, delete "whether-the" and insert --whether the--

Column 16, line 54, delete "manner: The cam" and insert --manner: the cam--

Column 17, line 40, delete "routine-is" and insert --routine is--

Column 19, line 29, delete "area-is" and insert --area is--

Column 22, line 59, delete "detectingr switch" and insert --detecting switch--

Column 25, line 31, delete "phase-into" and insert --phase into--

Column 27, line 24, delete "step S1605" and insert --stepS1505--

Signed and Sealed this

First Day of August, 2006

JON W. DUDAS
*Director of the United States Patent and Trademark Office*